United States Patent
Hedberg et al.

(10) Patent No.: US 9,843,977 B2
(45) Date of Patent: Dec. 12, 2017

(54) AVOIDING MASS MIGRATION OF WIRELESS COMMUNICATION DEVICES FROM ONE ACCESS POINT TO ANOTHER

(71) Applicant: Telefonaktiebolaget L M Ericsson (publ), Stockholm (SE)

(72) Inventors: Tomas Hedberg, Stockholm (SE); Filip Mestanov, Sollentuna (SE); Mattias Bergström, Stockholm (SE); Oumer Teyeb, Solna (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 14/892,475

(22) PCT Filed: May 20, 2014

(86) PCT No.: PCT/SE2014/050615
§ 371 (c)(1),
(2) Date: Nov. 19, 2015

(87) PCT Pub. No.: WO2014/189448
PCT Pub. Date: Nov. 27, 2014

(65) Prior Publication Data
US 2016/0174123 A1    Jun. 16, 2016

Related U.S. Application Data

(60) Provisional application No. 61/825,319, filed on May 20, 2013.

(51) Int. Cl.
*H04W 4/00* (2009.01)
*H04W 36/22* (2009.01)
(Continued)

(52) U.S. Cl.
CPC .......... *H04W 36/22* (2013.01); *H04W 36/08* (2013.01); *H04W 48/16* (2013.01); *H04W 48/18* (2013.01);
(Continued)

(58) Field of Classification Search
None
See application file for complete search history.

(56) References Cited

U.S. PATENT DOCUMENTS

2009/0097454 A1   4/2009  Yeou et al.
2009/0270104 A1*  10/2009 Du ....................... H04W 48/02
                                                         455/436

(Continued)

FOREIGN PATENT DOCUMENTS

WO    0176273 A2    10/2001
WO    01/76273 A2   11/2001

OTHER PUBLICATIONS

International Search Report issued in International Patent Application No. PCT/SE2014/050615, 2 pages (dated Sep. 25, 2014).

(Continued)

*Primary Examiner* — Jutai Kao
(74) *Attorney, Agent, or Firm* — Rothwell, Figg, Ernst & Manbeck, P.C.

(57) ABSTRACT

A wireless communication device (WCD), network node, and methods for determining whether to steer traffic from a first access point to a second access point according to an access network selection policy. The WCD obtains at least one input parameter for use in an algorithm that is part of the access network selection policy, obtains a random value, and determines whether to steer traffic from the first access point to the second access point based at least in part on the at least one obtained input parameter and the obtained random value. The at least one input parameter may be determined (Continued)

by the network node and signaled to the WCD. The network node may signal an indication to the WCD to cause the WCD to apply a random value when determining whether to steer traffic in accordance with the access network selection policy.

14 Claims, 16 Drawing Sheets

(51) Int. Cl.
| | |
|---|---|
| *H04W 48/18* | (2009.01) |
| *H04W 36/08* | (2009.01) |
| *H04W 48/16* | (2009.01) |
| *H04W 36/00* | (2009.01) |
| *H04W 36/14* | (2009.01) |
| *H04W 84/00* | (2009.01) |
| *H04W 84/12* | (2009.01) |

(52) U.S. Cl.
CPC .... *H04W 36/0066* (2013.01); *H04W 36/0083* (2013.01); *H04W 36/14* (2013.01); *H04W 84/005* (2013.01); *H04W 84/12* (2013.01)

(56) References Cited

U.S. PATENT DOCUMENTS

| | | | | |
|---|---|---|---|---|
| 2010/0323698 | A1* | 12/2010 | Rune | H04W 48/06 |
| | | | | 455/436 |
| 2015/0011158 | A1* | 1/2015 | Luo | H04W 16/26 |
| | | | | 455/11.1 |
| 2016/0029295 | A1* | 1/2016 | Nagasaka | H04W 48/18 |
| | | | | 370/237 |

OTHER PUBLICATIONS

International Preliminary Report on Patentability issued in International Patent Application No. PCT/SE2014/050615, 31 pages (dated Aug. 14, 2015).

"Introduction of WLAN/3GPP Radio interworking," 3GPP TSG-RAN2 Meeting #86, Version 12.0.0, Seoul, South Korea, 6 pages (May 19-23, 2014).

"Stage 2 description for WLAN / 3GPP Radio interworking," 3GPP TSG-RAN2 Meeting #86, Version 12.1.0, Seoul, South Korea, 9 pages, (May 19-23, 2014).

* cited by examiner

Existing network architectures for
E-UTRAN/EPC and S2a integration

*802.11 procedures*

Example of WLAN UE attaching to a WLAN network

Detailed example of generic EAP-AKA/AKA'

ANQP signalling in relation to 802.11

US 9,843,977 B2

AVOIDING MASS MIGRATION OF WIRELESS COMMUNICATION DEVICES FROM ONE ACCESS POINT TO ANOTHER

CROSS-REFERENCE TO RELATED APPLICATIONS

This application is a filing under 35 USC 371 of International Application No. PCT/SE2014/050615, filed May 20, 2014 designating the United States, which claims priority to US Provisional Application No. 61/825,319. The contents of the above identified applications are incorporated by reference.

TECHNICAL FIELD

This disclosure relates to techniques for avoiding mass migration of wireless communication devices between access points.

BACKGROUND

Mass migration (a.k.a., "mass toggling" or "mass switching") of wireless communication devices between access points (APs) refers to a large number of wireless communication devices switching from one AP (e.g., a base station such as an LTE eNodeB or other base station) to another AP (e.g., a Wireless Local Area Network (WLAN) access point (AP)—a.k.a., "Wi-Fi AP") within a relatively short window of time.

As used herein, the term wireless communication device refers to any device capable of communicating wirelessly with an access point. It is common to call to a wireless communication device (WCD) a "user equipment (UE)." Accordingly, in this document the terms WCD and UE are used interchangeably. That is, like a WCD, a UE is any device capable of communicating wirelessly with an access point.

Mobile operators (a.k.a., cellular operators) mainly use radio access technologies like GSM, cdma2000, WCDMA and LTE, but are increasingly using WLAN. Mobile operators are today using WLAN mainly to offload traffic from the mobile networks (a.k.a., cellular networks) they operate, but the opportunity to improve end user experience regarding performance is also becoming more important. Most current WLAN APs are totally separate from mobile networks, and are seen as non-integrated. The usage of WLAN is mainly driven due to the free and wide unlicensed spectrum, and the increased availability of WLAN in mobile terminals, like smartphones and tablets. The end users are also becoming more and more at ease with using WLAN, for example in offices and homes.

The different business segments for WLAN regarding integration possibilities can be divided into mobile operator hosted/controlled vs. 3rd party hosted/controlled WLAN access points (Aps) (here 3rd party is seen as anything else than mobile operator and that the 3rd party is not totally "trusted" by the mobile operator. 3rd party could be for example a WLAN operator or an end-user him/herself.). In both segments there exist public/hotspot, enterprise and residential deployments.

Different types of WLAN integration with mobile networks:

For simplicity we use the notation "3GPP" for typical cellular radio access technologies and use SAE/LTE nodes in the descriptions, but that doesn't restrict the methods used to the 3GPP-specified technologies (i.e. GSM, UTRAN, E-UTRAN).

WLAN integration with the mobile operators core network is emerging as a good way to improve end user experience. These solutions consist mainly of the components: common authentication between 3GPP and WLAN, and integration of WLAN user plane traffic to the mobile core network. The common authentication is based on automatic SIM-based authentication in both access types. The WLAN user plane integration provides the mobile operator the opportunity to provide the same services, like parental control and subscription based payment methods, for the end users when connected to the core network both via 3GPP and via WLAN. Different solutions are standardized in 3GPP: Overlay solutions (S2b, S2c) are specified since 3GPP Rel-8 while integration solutions (S2a) are currently work-in-progress (S2a, S2b, S2c indicating the 3GPP interface/reference point name towards the PDN-GW). These solutions are specified in 3GPP TS 23.402.

FIG. 1 shows the network architecture for E-UTRAN and EPC and how the eNodeB is connected via the S1-interfaces, S1-MME and S1-U to the MME and Serving GW respectively. It also shows how the WLAN access network is connected to the PDN-GW via the S2a interface and to the 3GPP AAA Server via the STa interface. The shown WLAN Access Network (AN) is just an example deployment and contains a WLAN Access Point (AP) (a.k.a., Wi-FI AP), WLAN Access Controller (AC) (a.k.a., Wi-FI AC), and a Broadband Network Gateway (BNG).

WLAN integration into Radio Access Network (RAN) is also emerging as an interesting study object. This has basically two different possible levels that could be implemented either separately or together. A first level of integration is to combine both 3GPP and WLAN in the small pico base stations to gain access to the WLAN sites with 3GPP technology and vice versa. The second level of integration is to integrate the WLAN access tighter into the RAN by introducing enhanced network controlled traffic steering between 3GPP and WLAN based on knowledge about the total situation on the different accesses. The driver for this second level of integration could be to avoid potential issues with UE controlled WLAN selection such as selecting WLAN when the WLAN connection is bad or when the UE is moving, thus giving better end user performance and better utilization of the combined WLAN and cellular radio network resources.

Access network discovery and selection function (ANDSF):

The UE determines whether to switch from 3GPP to WLAN and vice-versa (applicable for Idle mode or during traffic). That is, the UE selects which RAT to use. To enable the UE to do this selection, the UE is provisioned with an ANDSF policy ("Policy" for short) (or multiple Polices). In one example, a Policy includes: a) list of allowed WLAN cells (PLMN IDs) (this list may be stored in the SIM or in the I-WLAN management object (MO) (see 3GPP TS 24.235); and b) rules for selecting 3GPP or WLAN. See 3GPP TS 24.302, 24.312.

The ANDSF policy can be configured individually by the ANDSF server, based on the UE providing 'location' and 'operating system'. However, it is quite costly to provide Policy updates per location. The signaling sequence is both time consuming and large in data volume.

The provisioning of ANDSF policies is a rather slow and signaling-intensive procedure. It uses OMA-DM procedures, where the UE is notified using SMS and then queries the server. The XTML-encoded ANDSF Managed Object is then downloaded. Hence ANDSF policies will not be frequently updated and will remain unchanged over rather large areas.

Introduction to WLAN concepts.

WLAN is the marketing name for IEEE standard 802.11. It is a standard for both Level 1 (physical) and Level 2 (data link) of a wireless data transmission protocol. 802.11 defines many Level 1 variants. 802.11g is one higher speed Level 1 standard compared to 802.11b that was the first generation WLAN. The radio frequency bands used are normally unlicensed bands and include ISM-bands in 2.4 GHz and 5.2 GHz. Lately also 5.8 GHz is being introduced and even 60 GHz is an active discussion topic in the research area.

Selected WLAN concepts are as follows:

1) A service set is all the devices associated with a local or enterprise IEEE 802.11 wireless local area network (WLAN).

2) The basic service set (BSS) is the basic building block of an 802.11 wireless LAN. In infrastructure mode, a single access point (AP) together with all associated UEs (STAB) is called a BSS. This is not to be confused with the coverage of an access point, which is called basic service area (BSA). An access point acts as a master to control the UEs within that BSS. Each BSS is identified by a basic service set identification (BSSID) that is normally the MAC address of the AP (i.e. 48 bits). The simplest BSS consists of one access point and one UE (a.k.a., "station"). The BSS is in many ways similar to a cell in mobile network.

3) An extended service set (ESS) is a set of one or more interconnected BSSs and integrated local area networks that appear as a single BSS to the logical link control layer at any UE associated with one of those BSSs. The set of interconnected BSSs must have a common SSID. They can work on the same channel, or work on different channels to boost aggregate throughput.

4) The Service Set Identifier (SSID) is the network Identifier, and so called friendly name for the service set (i.e. either BSS or ESS). The maximum length of the SSID is 32 octets A beacon frame (see FIG. 2) is one of the management frames in IEEE 802.11 based WLANs. It contains all the information about the network. Beacon frames are transmitted periodically to announce the presence of a Wireless LAN network. Beacon frames are transmitted by the Access Point (AP) in an infrastructure BSS. A probe request frame is sent from a UE when it requires information from the access point and a probe response frame is sent from an access point containing capability information, supported data rates, etc., after receiving a probe request frame. In addition there are multiple different frame like data frames, control frames and other management frames related to the following procedures.

In an infrastructure network, UEs must associate with an access point to obtain network services. Association is the process by which UE joins an 802.11 network. Mobile UEs always initiate the association process, and access points may choose to grant or deny access based on the contents of an association request. When a mobile UE moves between basic service areas within a single extended service area, it must evaluate signal strength and perhaps switch the access point with which it is associated. Re-associations are initiated by UEs when signal conditions indicate that a different association would be beneficial; they are never initiated by the access point. To terminate an existing association, UEs may use the disassociation service. Once disassociation is complete, it is as if the UE is no longer attached to the network. Disassociation is a polite task to do during the UE shutdown process.

Authentication is a necessary prerequisite to association because only authenticated users are authorized to use the network. Deauthentication terminates an authenticated relationship. Because authentication is needed before network use is authorized, a side effect of deauthentication is termination of any current association.

FIG. 2 shows the above described association procedure at a high level.

FIG. 3 shows an example procedure for a WLAN UE connecting to a WLAN network with a WLAN Access Controller. Other procedure may also be used depending on implementation in the UE and network. The EAP signalling is in this procedure used to authenticate the UE towards the network. The UE uses IMSI or some other certificate to identify itself towards the network. Note that the 802.11 Authentication Response only opens limited ports to allow the EAP Authentication to proceed. Hence the 802.11 Layer 2 Association Response only provides a "pending association" and full association is granted upon successful completion of EAP Authentication.

When the UE accesses WLAN network it can be authenticated using EAP-SIM/AKA/AKA' protocols. This may be the typical case of a combined UE/STA in the future. The UE can in these cases be identified by either the full authentication Network Access Identifier (NM) or by the fast re-authentication NAI. The full authentication NM contains the IMSI of the UE and the fast re-authentication NM is similar to the temporary identities used in LTE access in the sense that it is the 3GPP AAA Server that knows the relation between the fast re-authentication NAI and the full authentication NAI. Therefore it is the 3GPP AAA server that knows the relation between the fast re-authentication NM and the IMSI.

FIG. 4 shows a more detailed example of generic EAP-AKA/AKA' signalling flow.

Different standards organizations have started to recognize the needs for an enhanced user experience for WLAN access, this process being driven by 3GPP operators. An example of this is the WLAN Alliance with the Hot-Spot 2.0 (HS2.0) initiative, now officially called PassPoint. HS2.0 is primarily geared toward WLAN networks. HS2.0 builds on IEEE 802.11u, and adds requirements on authentication mechanisms and auto-provisioning support.

The momentum of Hot-Spot 2.0 is due to its roaming support, its mandatory security requirements and for the level of control it provides over the terminal for network discovery and selection. Even if the current release of HS2.0 is not geared toward 3GPP interworking, 3GPP operators are trying to introduce additional traffic steering capabilities, leveraging HS2.0 802.11u mechanisms. Because of the high interest of 3GPP operators, there will be a second release of HS2.0 focusing on 3GPP interworking requirements.

The HS2.0 contains the following procedures:

1) Discovery: where the terminal discovers the WLAN network, and probes them for HS2.0 support, using 802.11u and HS 2.0 extensions.
2) Registration is performed by the terminal toward the WLAN Hot-spot network if there is no valid subscription for that network.
3) Provisioning: Policy related to the created account is pushed toward the terminal. This only takes place when a registration take place.
4) Access: cover the requirements and procedures to associate with a HS2.0 WLAN network.

HotSpot 2.0 uses Access Network Query Protocol (ANQP) as part of the network discovery and selection function. It provides a mechanism for the UE to request different information from AP before association. FIG. 5 shows the main principle for ANQP. ANQP is carried in the Generic Advertisement Services (GAS) protocol.

SUMMARY

A problem exists with current communication technologies with respect to UEs moving to or from a RAT. For example, with the current technologies there are some situations where "signaling tsunamis" occur due to numerous UEs moving to or from a RAT (e.g., 3GPP). As an example, consider a train passing through areas with 3GPP coverage entering or leaving a train station, which has WLAN coverage. In such a scenario there is a risk that many UEs on the trail will try to switch from 3GPP coverage to WLAN coverage at the same time. Furthermore, if UEs evaluate the expected performance of the "the other system", there is a risk of "ping-pong" behavior, i.e. UEs toggling between 3GPP and WLAN until the traffic distribution has stabilized. Described herein are technological solutions for mitigating these UE mass migration problems. At a general level, in some embodiments, the solutions rely on introducing randomization in to the RAT selection process.

In one aspect, a method performed by a wireless communication device (WCD) for determining whether to steer traffic from a first access point to a second access point according to an access network selection policy is provided. In some embodiments, the method includes the WCD obtaining (e.g., receiving or retrieving) at least one input parameter for use in an algorithm that is part of the access network selection policy. In some embodiments, the WCD obtains the at least one input parameter by receiving the at least one input parameter from a radio access network. The at least one input parameter may be one of a time-to-trigger parameter, a signal quality parameter, and a load parameter. If an input parameter is a signal quality parameter, the input parameter may be one of: a reference signal received power (RSRP) measure, reference signal received quality (RSRQ) measure, a received signal strength indication, and a received channel power indicator. If an input parameter is a load parameter, the input parameter may be one of: a basic service set load, a cellular network load, and a wireless local area network metric. The method also includes the WCD obtaining (e.g., receiving or generating) a random value (e.g., a random number). Further, the method includes the WCD determining whether to steer traffic from the first access point to the second access point based at least in part on the at least one obtained input parameter and the obtained random value.

In some embodiments, method further includes the WCD obtaining the access network selection policy. The step of obtaining the access network selection policy may include one of: i) receiving the access network selection policy, and ii) retrieving the access network selection policy from a storage device in the WCD.

In some embodiments, the step of determining whether to steer traffic from the first access point to the second access point comprises using the random value to scale the at least one obtained input parameter. In some embodiments, determining whether to steer traffic from the first access point to the second access point further comprises using the scaled at least one obtained input parameter in the algorithm that is part of the access network selection policy.

In one aspect, a method performed by a network node (e.g., base station, core network node, etc.) is provided. The method includes the network node determining at least one input parameter for use in an algorithm that is performed by a wireless communication device, WCD, as part of an access network selection policy for determining whether to steer traffic from a first access point to a second access point. The method also includes the network nodes signaling the at least one input parameter to the WCD. The method further includes the network node signaling an indication to the WCD to cause the WCD to apply a random value when determining whether to steer traffic in accordance with the access network selection policy. The indication may be a single bit value. The at least one input parameter may be at least one of: a time-to-trigger parameter, a signal quality parameter, and a load parameter. In some embodiments, the network node signals the access network selection policy to the WCD.

These and other aspects and embodiments are described below.

DETAILED DESCRIPTION

For the sake readability and simple explanation, this disclosure uses 3GPP and WLAN as example technologies. Nevertheless, this disclosure could be also applied to other technologies.

Figure 1:
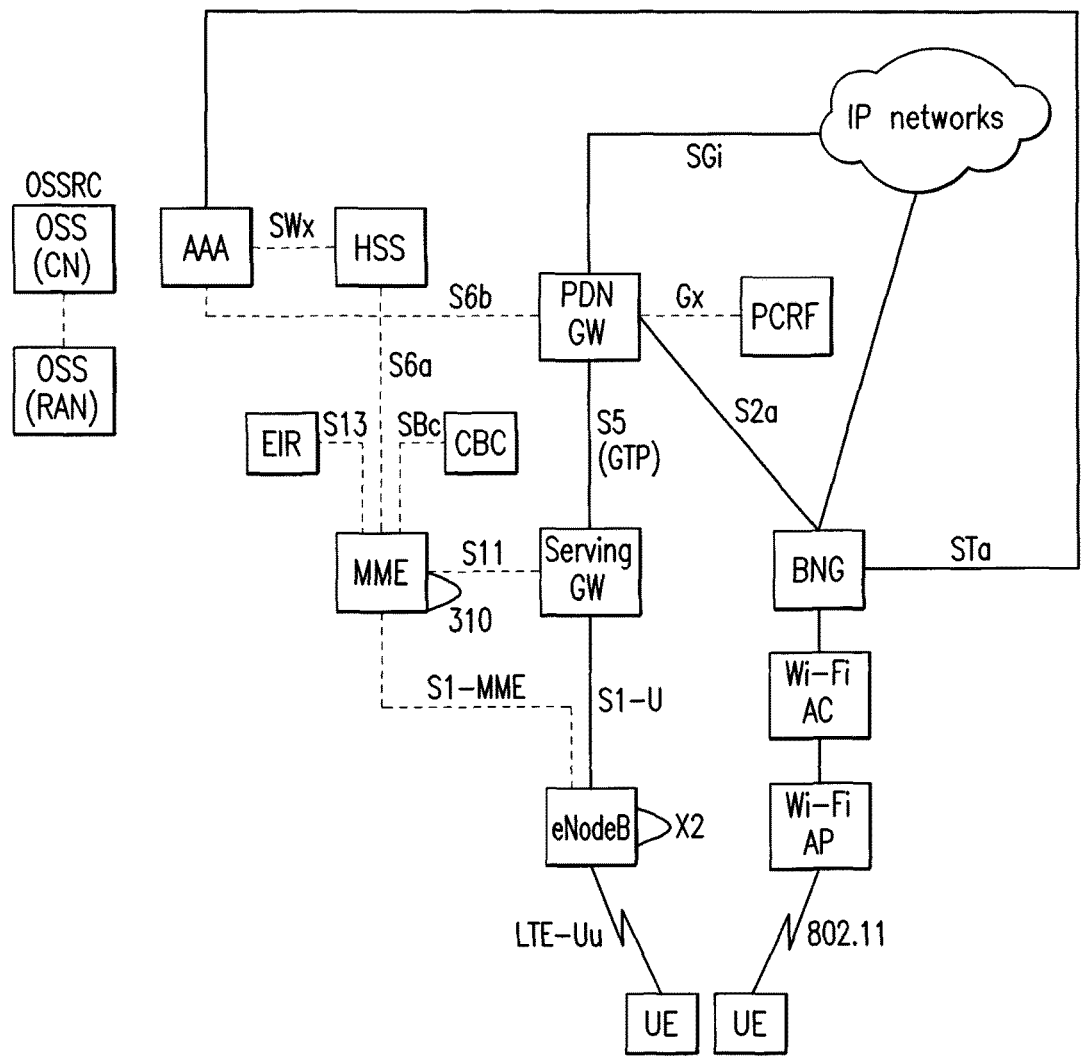
FIG. 1 illustrates a network architecture.
Figure 2:
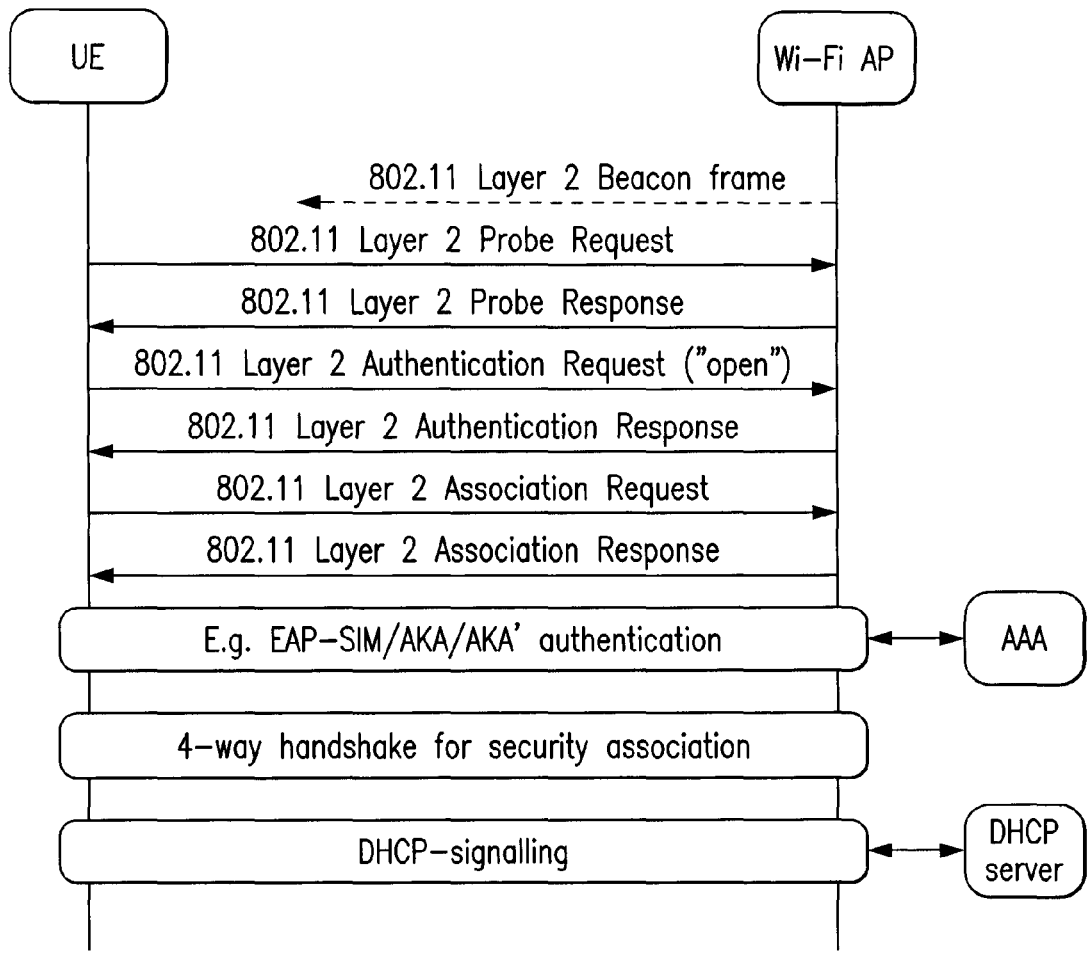
FIG. 2 illustrates messages exchanged between a UE and a Wi-Fi AP.
Figure 3:
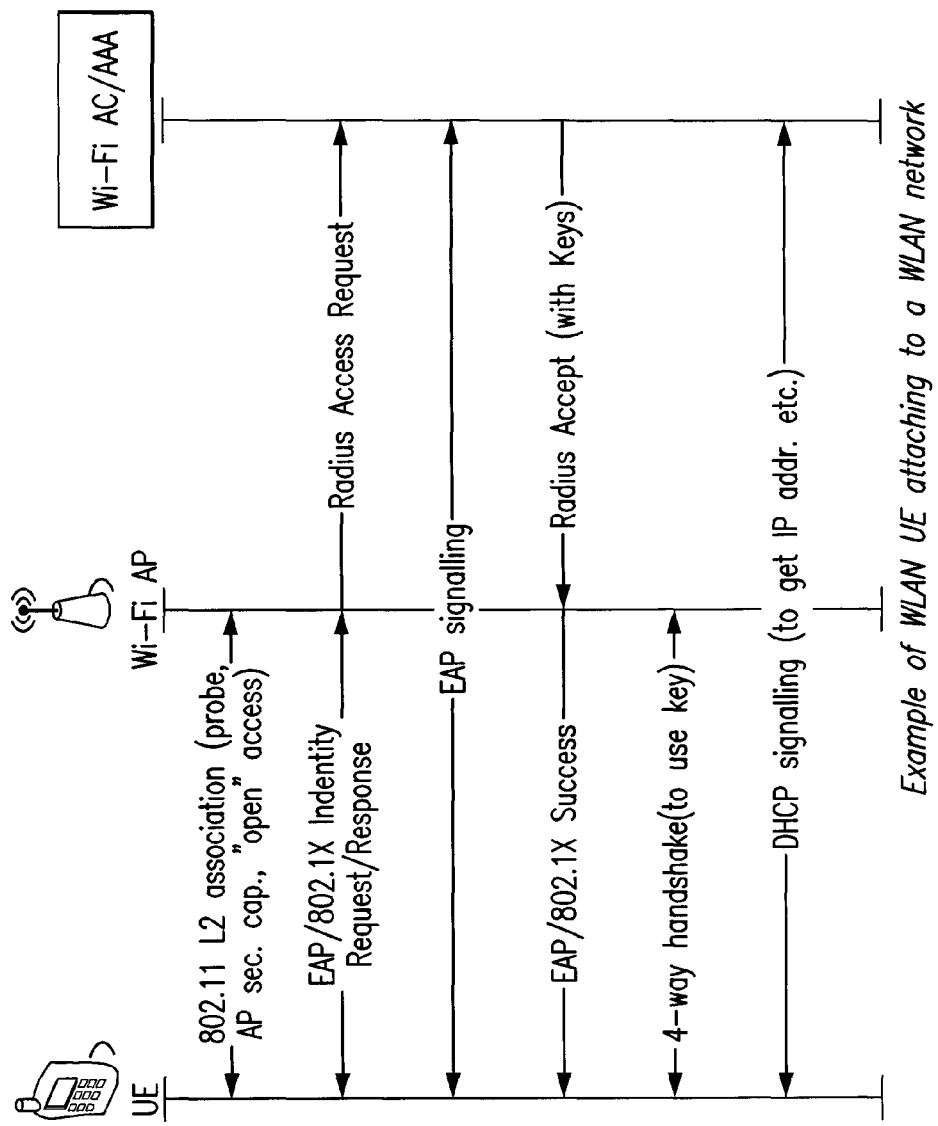
FIG. 3 shows an example procedure for a WLAN UE connecting to a WLAN network with a WLAN Access Controller.
Figure 4:
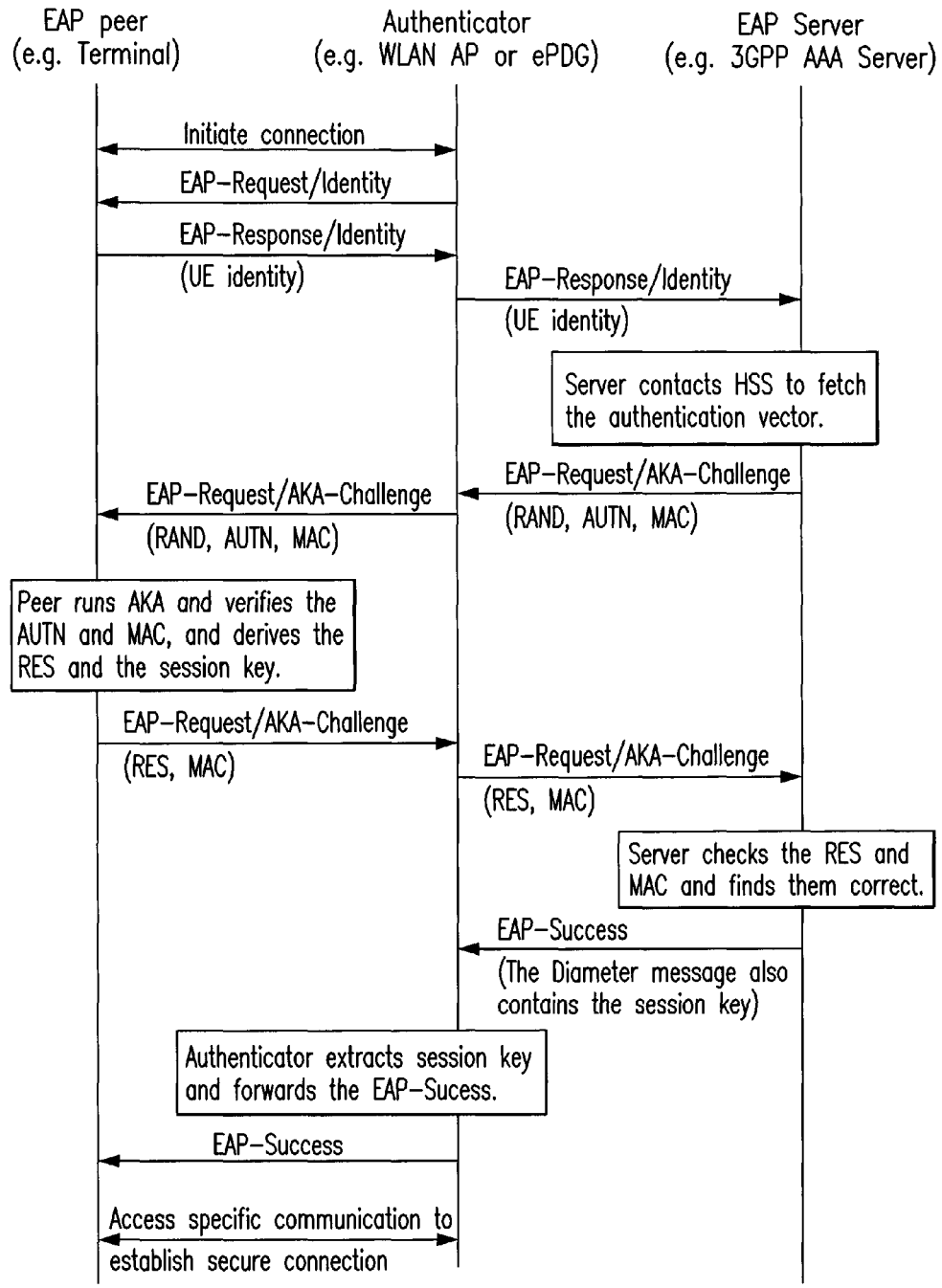
FIG. 4 shows a generic EAP-AKA/AKA' signalling flow.
Figure 5:
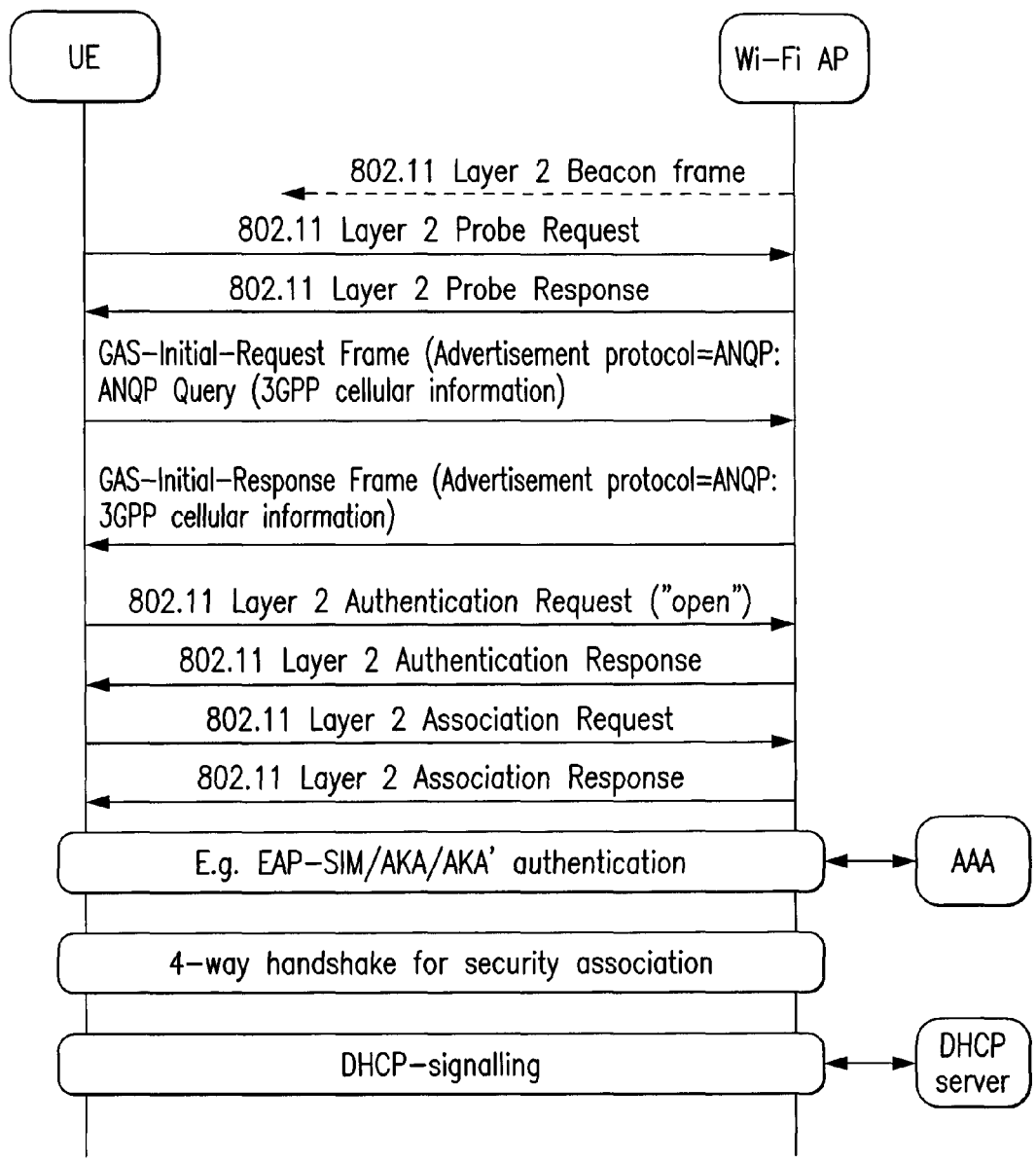
FIG. 5 illustrates messages exchanged between a UE and a Wi-Fi AP.
Figure 6:
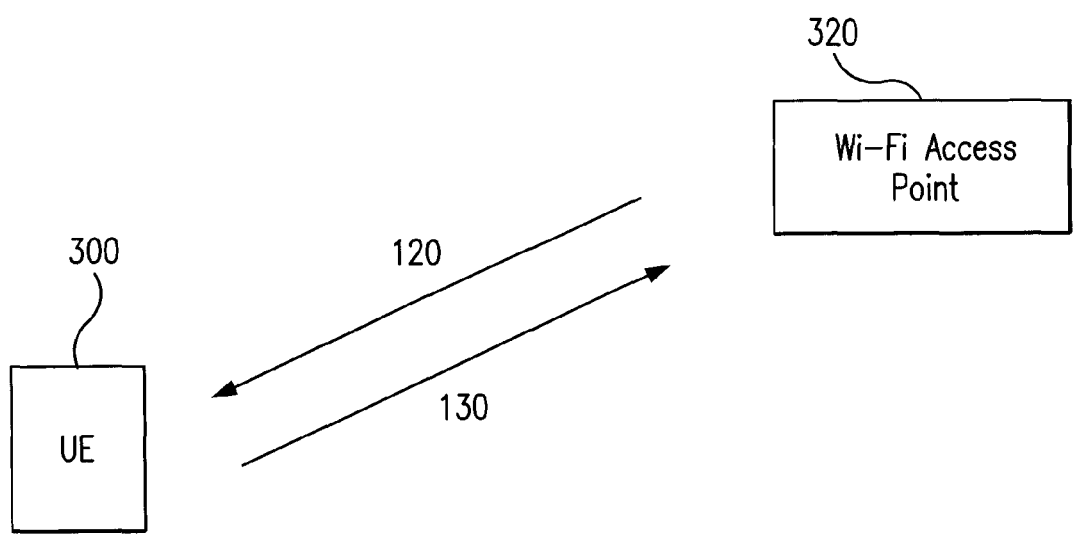
FIG. 6 illustrates a UE communicating with a Wi-Fi AP.

FIG. 6 illustrates a UE 300 able to communicate with a Wi-Fi AP 310 using, for example, the 802.11 specified protocols. The downlink communication 120 is directed from the Wi-Fi AP 310 to the UE 300 and the uplink communication 130 is directed from the UE 300 to the Wi-Fi AP 310.

For the UE 300 to find an Wi-Fi AP to connect to, a beacon frame is transmitted from the Wi-Fi AP 110. This beacon frame indicates details about the Wi-Fi AP and provides the UE with enough information to be able to send a request for access. Accessing Wi-Fi AP 110 includes an information exchange between UE 300 and Wi-Fi AP 110, including, e.g., probe requests and response, authentication requests and response, as described above.

Figure 7:
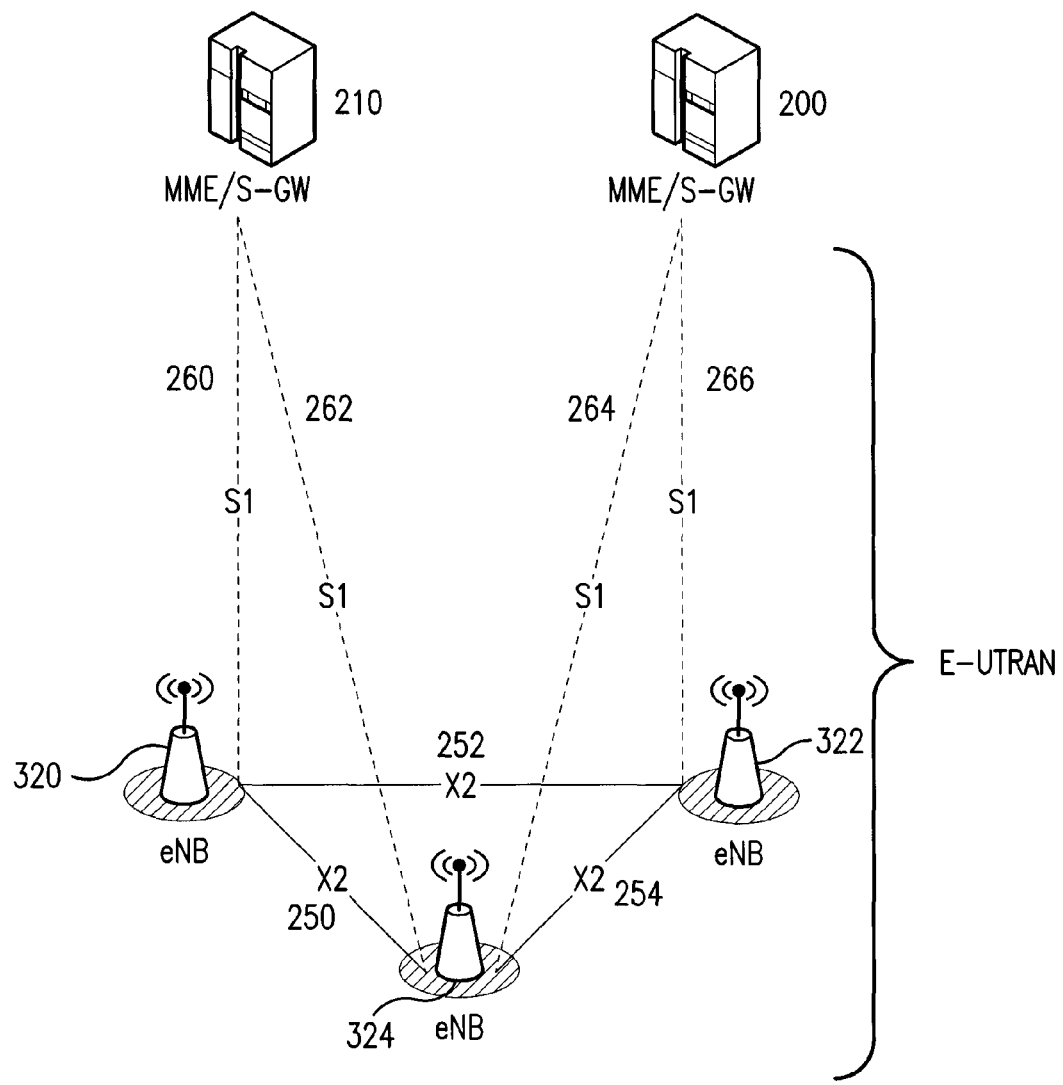
FIG. 7 illustrates a portion of an LTE RAN and example controller nodes.

FIG. 7 illustrates a portion of an LTE RAN and controller nodes. The LTE RAN, which is known as the Evolved UMTS Terrestrial Radio Access Network (E-UTRAN), consists of base stations called enhanced NodeBs ("eNBs" or "eNodeBs") 320, 322, 324 providing the E-UTRA user plane and control plane protocol terminations towards the UE. The eNBs are interconnected with each other by means of the X2 interface 250, 252, 254. The eNBs are also connected by means of the S1 interface to the EPC (Evolved Packet Core) 260, 262, 264, 266, more specifically to the MME (Mobility Management Entity) 200, 210 by means of the S1-MME interface and to the Serving Gateway (S-GW) 200, 210 by means of the S1-U interface. The S1 interface supports many-to-many relation between MMEs/S-GWs and eNBs.

The eNB hosts functionalities such as Radio Resource Management (RRM), radio bearer control, admission control, header compression of user plane data towards serving gateway, routing of user plane data towards the serving gateway. The MME is the control node that processes the signaling between the UE and the CN. The main functions of the MME are related to connection management and bearer management, which are handled via Non Access Stratum (NAS) protocols. The S-GW is the anchor point for UE mobility, and also includes other functionalities such as temporary DL data buffering while the UE is being paged, packet routing and forwarding the right eNB, gathering of information for charging and lawful interception. The PDN Gateway (P-GW) is the node responsible for UE IP address allocation, as well as Quality of Service (QoS) enforcement.

Figure 8:
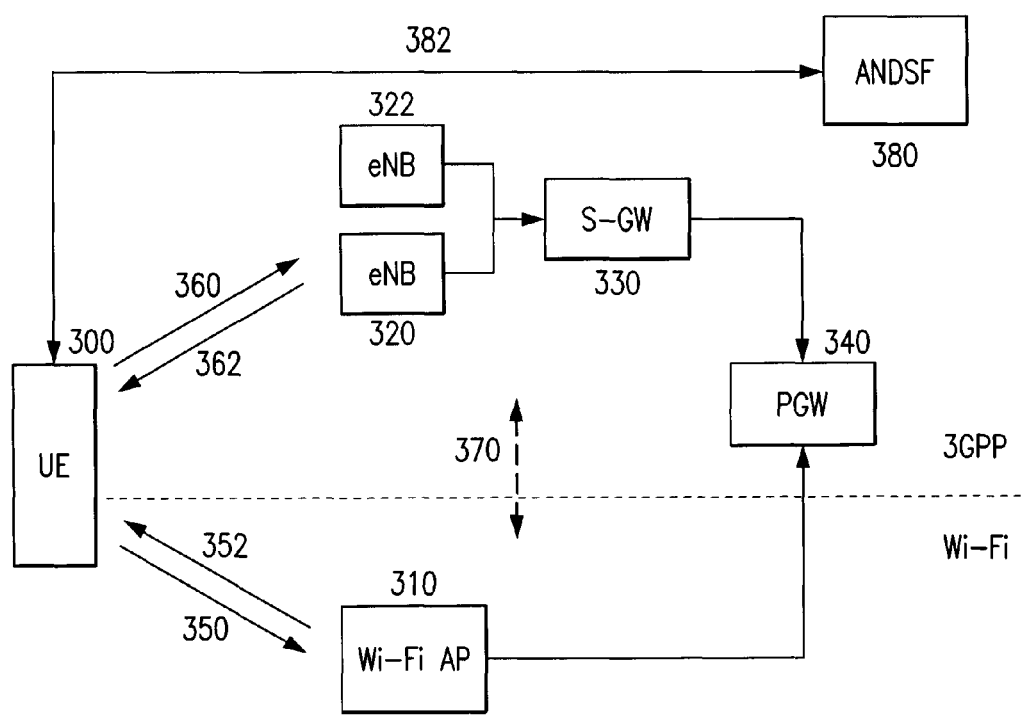
FIG. 8 illustrates a network where the E-UTRAN radio access points and the Wi-Fi wireless AP are both connected to the same P-GW.

FIG. 8 illustrates a network where the E-UTRAN radio access points 320, 322 and the Wi-Fi wireless AP 310 are both connected to the same P-GW 340. A UE 300 capable of being served both from the Wi-Fi AP 310 and the LTE eNB's 320, 322 is shown. FIG. 8 illustrates one possible way of connecting a Wi-Fi access network to the same core network as the 3GPP specified access network. It should be noted that the disclosure is not restricted to scenarios when the Wi-Fi access network is connected in this way, scenarios where the networks are more separate, e.g., like illustrated in FIGS. 6 and 7 are also possible scenarios.

There can be an interface 370 between the Wi-Fi and 3GPP domains, whereby the two networks can exchange information that can be used to facilitate on steering traffic over the right network. One example of such information exchanged via the interface 370 is load condition information in the two networks. The two networks can also exchange information with regard to the context of the UE 300, so that they can be aware if the UE is being served by the other network, as well as some details of the connection over the other network (e.g. traffic volume, throughput, etc. . . . ). Additionally, in one embodiment, Wi-Fi AP 310 and eNBs 320, 322 can transmit load condition information so that UE 300 can obtain information concerning the load on Wi-Fi AP 310 and eNBs 320, 322, respectively. The load information may be unicast to UE 300 or the load information may be broadcast such that potentially any UE in the vicinity can obtain the load information.

It should be noted that, while not depicted in FIG. 8 for the sake of clarity, an AP controller (AC) functionality exists in the Wi-Fi domain that controls the Wi-Fi AP 310, and this functionality can be physically located in 310, 340 or another separate apparatus.

ANDSF policies reside in the Access Network Discovery and Selection Function (ANDSF) server 380, and these are communicated via interface 382 to the UE 300. In one embodiment, the server 380 communicates the policies to the UEs by using SOAP-XML, messages and an over-the-top (OTT) signaling channel.

The ANDSF server 380 is an entity that is defined by 3GPP for providing access discovery information as well as mobility and routing policies to the UE. ANDFS is an entity added to the 3GPP architecture in Release 8 of 3GPP TS 23.402 (See "Architecture Enhancements for non-3GPP Accesses," 3GPP TS 23.402, v. 11.4.0 (September 2012), available at www.3.gpp.org). As shown in FIG. 8, the ANDSF server is connected to the UE, and its main goal is to provide the UE with access network information in a resource efficient and secure manner. By supplying information about both available 3GPP and non-3GPP access networks to the UE, the ANDSF enables an energy-efficient mechanism of network discovery, where the UE can avoid continuous and energy-consuming background scanning. Furthermore, the ANDSF provides the mobile operators with a tool for the implementation of UE steering of access mechanisms, where policy control can guide UEs to select one particular RAN over another.

In addition to providing Policies to the UE, server 380 may also provide to the UE discovery information. The discovery information provides the UE with information regarding the availability of different RATs in the UE's vicinity. This helps the UE to discover available (3GPP and) non-3GPP APs without the burden of continuous background scanning.

With the proliferation of devices that have both Wi-FI and 3GPP mobile broadband support, offloading traffic to the Wi-Fi network is becoming very interesting, both from the user's and the operator's perspectives. The main difference between traffic steering in the Wi-Fi case as compared to steering between 3GPP networks (or 3GPP-"friendly" networks such as CDMA2000) is that it is the UE 300 that decides when it shall select a Wi-Fi AP (AP), while in the latter case it is the network that is in charge of the network access decisions. Due to technical and historical reasons, the Wi-Fi deployment scenario is in many cases fundamentally different than the cellular deployment. For this reason, special considerations have to be made when integrating Wi-Fi to 3GPP networks.

For example, in embodiments where the UE decides whether and when to migrate to Wi-Fi AP 310, there may be situations where a mass migration of UEs to the Wi-Fi AP occurs.

Consider, for example, the case of a train filled with people using UEs. At one point in time, the UEs may be attached to, for example, an eNodeB. At another, later point in time, while the UEs are still attached to the eNodeB (in idle or active state), the train may enter a train station and in the train station there may exist a Wi-Fi AP. If all or many of the UEs on the train use the same Policy, it may be the case that all or many of the UEs may decide at about the same time to "migrate" from the eNodeB to the Wi-Fi AP—for example, the UEs may decide, at about the same time, to detach from the eNodeB and associate with the Wi-Fi AP or to otherwise steer traffic towards the Wi-Fi AP. Such a mass migration of UEs to the Wi-Fi AP may over load the Wi-Fi AP (e.g., the mass migration may negatively affect signaling load and peak rate). Such an overload condition could cause many UEs to steer traffic back to the eNodeB. Hence, it is desirable to reduce the possibility of mass migration of UEs to an AP.

Accordingly, this disclosure presents various methodologies to reduce the chance of having a mass migration of UEs to an AP. The methodologies achieve this risk reduction by increasing the chance that the UEs will evaluate whether to migrate to the AP at different times, and, as a result, some UEs that otherwise would have migrated to the AP may not migrate to the AP because at the time these UEs perform the evaluation the AP load, which may be signaled by the AP, the load may be too high to cause a migration due to other UEs associating to the WLAN.

Six such methodologies are described below:

1) Providing pseudo-randomly varied Policies to UEs;
2) Providing pseudo-randomly varied policies to groups of UEs;
3) Including a policy algorithm part, which is randomized based on input parameters. The parameters may be provided in 3GPP or WLAN cells. The controlling parameters may be one or more of the following: a) Randomization applies in this area (binary yes/no), b) Randomization amplitude, c) Randomization distribution (rectangular, etc., d) Which parameter shall randomized.
4) An alternative to approach 3, where steps c. and d. are replaced by: e) Likelihood of selection of one technology (3GPP or WLAN) when certain conditions are met;
5) The UE autonomously (i.e., with no network assistance whatsoever) solves the mass-toggling issue, based on monitoring different network parameters that could indicate a high mass-toggling risk; and
6) An alternative policy application algorithm, based on minimum and maximum time-to-trigger (TTT), which can be adaptively adjusted based on UE mobility and traffic indications.

The randomization value (which could be multiplied by factor b.) could be generated by the UE itself or based on a pseudo-random value in the UE (e.g. IMSI or IMEI).

3—Policy Algorithm Part—Random Distribution

Step a. (indicator that randomization applies in this area) is an independent embodiment. Step a. may be signaled both in 3GPP cells and/or WLAN 'cells'. Allocating the signaling to WLAN has two benefits: more location-specific due to smaller WLAN 'cells' and no need to provide information in multiple 3GPP RATs.

Step b. (multiplier) is an independent embodiment. Step b. provides a "multiplier". The random variable created by the UE should have a given distribution range (e.g., [0:1]). The resulting value is then multiplied by the value of an amplitude parameter. This parameter can be explicitly signaled to a particular UE (allows for per-UE control of policy execution) or a group of UEs (allows for per-UE-groups control). Another option is to include the parameter as part of the policy provided to the UE.

Step c. describes the mechanism for creating the random variable.

Step d. identifies the parameter(s) to be randomized. Parameters may for example be: i) time-to-trigger (TTT) during which conditions for change of technology must be fulfilled; ii) Minimum/maximum signal quality (receive signal strength indicator (RSSI), Reference Signal Received Quality (RSRQ), Received Channel Power Indicator (RCPI) etc.) for cells to be suitable candidates; iii) Minimum/maximum load (BSS load, WAN metrics, 3GPP load, etc.)

Example Use case for Methodology #3:

In this use case we shall assume that UE 300 is currently attached to eNB 320 and is not associated with Wi-Fi AP 310.

The use case begins with UE 300 obtaining a Policy. The Policy may be retrieved from internal storage device included in UE 300 (e.g., a SIM card) or it may be received from ANDSF server 380. The Policy includes a Wi-Fi AP selection condition and an identified action. If the Wi-Fi AP selection condition is true, then UE 300 performs the identified action. The condition may be of the form X>T1, where X is some selection parameter (e.g. signal quality indicator—RSSI, RCPI, RSRQ; load indication value; etc.) and T1 is a threshold. If the value X is greater than the value T1, then the condition is true. The condition may also be a compound condition, such as X>T1 and Y>T2. In this case, the condition is true if X is greater than T1 and Y is greater than T2. The identified action may be a set of actions such as: "wait at least ttt amount of time, then after ttt amount of time elapses evaluate again whether the selection condition is true, and if the condition is still true, then associate with the AP. The parameter ttt is known as the time-to-trigger (TTT) value.

Next, UE 300 determines whether it should use the Policy or a modified version of the Policy. UE 300 may obtain the modified version of the policy from server 380 or it may create it itself. In one embodiment, the determination as to whether to use the Policy or the modified Policy may be based on the value of a parameter received from eNB. For example, the parameter may be a one-bit value. If the value of the parameter is 0, then UE 300 uses the Policy and if the value is 1 then UE 300 uses the modified Policy. In another embodiment, the determination as to whether to use the Policy or the modified Policy may be based on a value generated by UE 300. For instance UE 300 may generate a random value (e.g., a real random value or a pseudo random value) and based on the generated random value select one of the Policy or the modified Policy.

Assuming the UE 300 determines to use a modified version of the Policy, then UE 300: a) generates a random value (r); b) determines whether the condition specified in the Policy is true; and c) if the condition is true, then ci) calculates a time-to-trigger value (ttt) using r, A and a default time-to-trigger value (dt) specified in the Policy, where A is the value of the amplitude parameter and performs the action specified in the policy (e.g., ttt=(r)×(A)×(dt)), cii) wait at least ttt amount of time, ciii) then after ttt amount of time elapses evaluate again whether the selection condition is true, and civ) if the condition is still true, then associate with the AP 310.

4—Policy Algorithm Part—Probability of Choosing a Certain RAT

For the alternative 4, step e. provides directly a measure of the likelihood that the UE shall select an AP when the selection condition specified in the Policy is true after the UE as waited the required TTT. Example: the likelihood can be set at 30%. If the UE 300 determines that the selection condition in the Policy is true during the TTT period, then the UE 300 will generate a random value from a uniform distribution over the range [0:1], and if the value is less than 0.3, then the UE 300 will associate to the AP. If the value, however, is greater than 0.3 the UE can wait a certain amount of time before repeating the process.

The condition e. may use all available measures related to the 3 GPP and/or WLAN networks. Examples of currently available measures: RSSI/RCPI, RSRP, RSRQ, BSS Load, WAN Metrics and combinations thereof. In the future further measures may become available from the 3GPP and/or WLAN networks.

For some measures, e.g. 'load' (for which many different definitions exist and we here just assume they are comparable across technologies) or 'estimated user bit rate', the target technology may be defined by the measure. Example: select the technology with lowest load or highest bit rates.

All parameters (e.g., threshold values) may be provided over system broadcast, e.g. the 802.11 Beacon/Probe RQ/RS or 3GPP System Information.

Parameters may also be provided by already existing dedicated signaling, e.g. at a Locating Update (primarily RAU/TAU, since these are not 'delayed') in the 3GPP system. Also ANQP is possible, but may be undesirable due to more added signaling than with the alternatives.

The triggering conditions for selecting one network technology are usually specified by setting thresholds, such as RSSI>Threshold 1. Even if several UEs satisfy the conditions at the same time, the "level of satisfaction" could be different. For example, the measured RSSI for UE1 could be Threshold1+1 dB, and the RSSI for UE2 could be Threshold1+10 dB. This information can be used to assign different priorities for access selection. For example, the setting could be if RSSI>Threshold1, likelihood of switching is 30%, if RSSI>Threshold1+3 dB, likelihood of switching is 50%, if RSSI>Threshold1+5 dB, likelihood of switching is 90%, etc. The network communicates these offsets of the likelihood either individually or using some compressed fashion (e.g. for every 2 dB increase above the threshold, increase the likelihood by 50% more than the default value). By setting different likelihood of switching to another access link based on the "level of satisfaction" of the conditions, the probability of mass migration is reduced even further as it is highly unlikely that all the UEs satisfying the conditions do so to the same level.

5—UE-Based Autonomous Policy Algorithm

Figure 9:
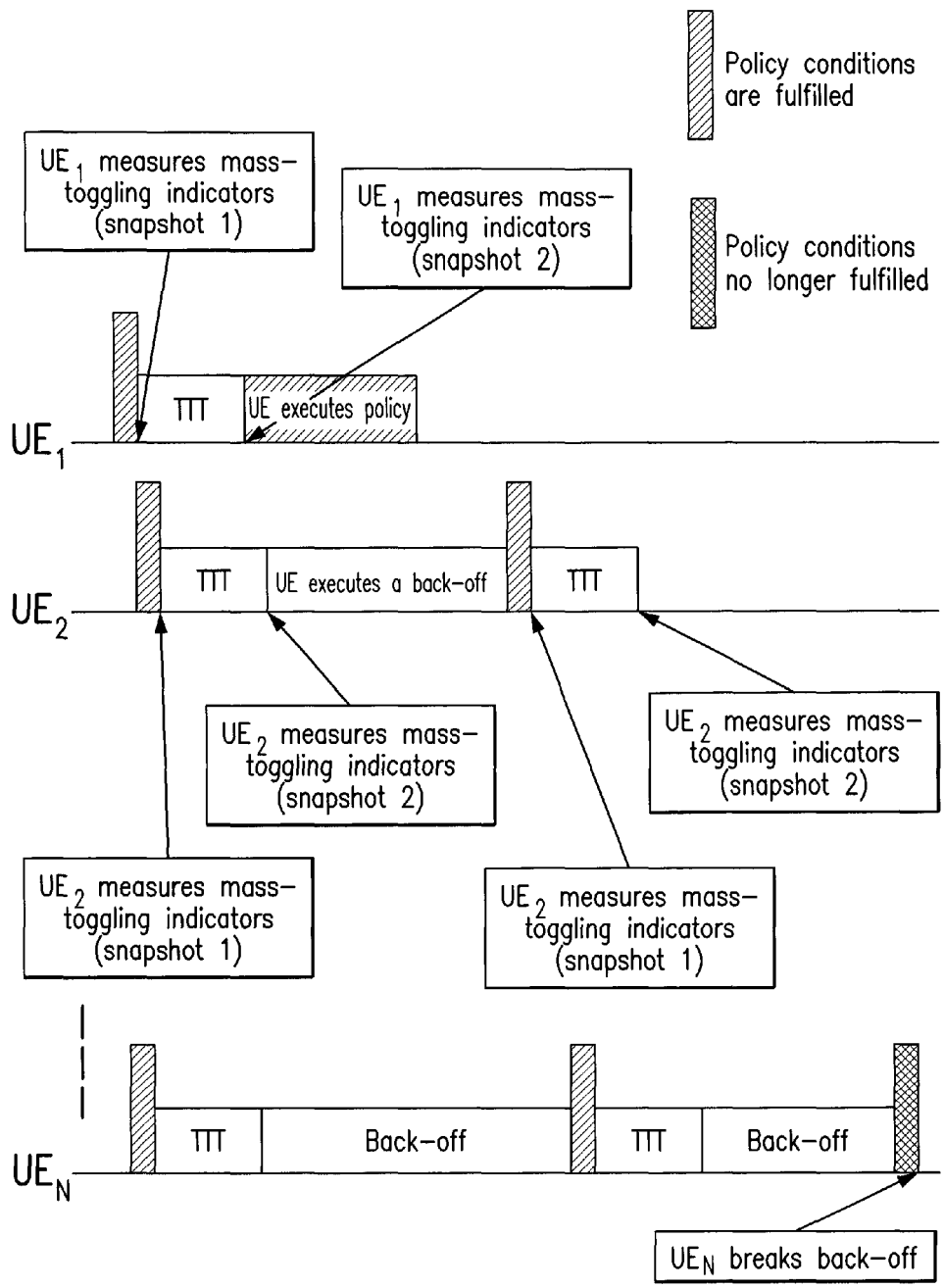
FIG. 9 illustrates there example scenarios according to some embodiments.

This algorithm execution is shown on FIG. 9.

The details of the algorithm are explained using a simple example scenario—several UEs are provided with certain policies for WLAN selection based on conditions in both the WLAN and 3GPP RANs. At a certain moment, the conditions are fulfilled and one or several UEs need to switch to WLAN. The procedure is as follows:

1) Once the policy conditions for UE1 are fulfilled, UE1 takes a snapshot of mass-migration indicators. The mass-migration indicators can be parameters that vary between technologies, but they have the property that they could indicate that there is a risk of a mass-migration. In WLAN, this parameter can be the number of associated UEs for example. If the number of associated UEs increases by more than a threshold amount over a relatively short amount of time that could indicate that many UEs are attempting to associate to WLAN at the same time (a mass-migration). For E-UTRAN, this parameter can be for example the Eb/No (energy per bit (Eb) to noise power spectral density (No) ratio).

2) After the snapshot has been recorded, the UE1 waits for a certain amount of time (TTT in this case) and takes another snapshot of the same parameters as before. If the snapshot comparison yield values that indicate that there is low mass-migration risk (e.g., the number of associated UEs has not changed significantly in relation to the time interval) UE1 executes the WLAN steering according to its policies.

3) However, if after the second snapshot the UE identifies that the mass-toggling indicators yield values indicating high risk of mass-toggling (e.g., the number of associated UEs has increased during a short amount of time), the UE executes a back-off (i.e., waits for a certain amount of time, while continuously evaluating the policy conditions)—this is the case for UE2. If during the back-off interval the policy conditions are no longer fulfilled, the UE drops the execution of the policy (the case for $UE_N$ in FIG. 9). If, however, the policies are still fulfilled after the back-off period has expired, the UE repeats the procedure, starting at step 1 above.

Observations:

1) The TTT might not necessarily be the same for all UEs. One possibility is to allow for different TTT for different UE groups. In that case the operator would be able to give priority for a certain type of subscribers (e.g., gold subscribers can have a longer TTT than bronze subscribers—in that way they will tend to use more the 3GPP network instead of steering to WLAN). However, the different TTT will introduce unfairness in the network and might result in "discrimination" against certain UEs; and 2) The back-off interval selection could be done in a random manner for each draw or a more complicated mechanism can be used, where: i) The UE selects the first back-off slot randomly, with the interval [Back-offmin: Back-offmax]; and ii) For each consecutive back-off slot, the Back-offmax value is increased, yielding longer back-off slot with each draw following draw.

6—Policy Algorithm with Variable Minimum and Maximum TTT

The TTT value during which the conditions specified have to hold in order to trigger access switching can be made to vary in accordance with some rules to reduce the likelihood of mass toggling even further. A minimum and a maximum TTT values can be set, and the actual TTT value a particular UE chooses could be set in different ways, for example:

a) Use the "level of satisfaction". For example, if the UE conditions barely met the requirements, the UE could choose values closer to the maximum TTT, while if the conditions are met very satisfactorily (e.g. RSSI>Threshold1+X dB, where X is some specified value), the minimum TTT will be chosen;

b) Use the traffic activity level of the UE. For example, if the UE has heavy traffic, it might be beneficial to offload that UE as soon as possible if the serving access link/network is overloaded, and thus it can be assigned a value closer to the minimum TTT, while those UEs with low traffic activity can be assigned values closer to the maximum TTT;

c) Use information regarding the active bearers: For example, if the UE has real time bearers with strict delay requirements, it might be beneficial to keep the current serving access network/link as long as possible in order to avoid drop in perceived user experience as handover/offloading could take some time. Thus, in this case it might be beneficial to use values closer to the maximum TTT. While in cases where the UE has only background services with very loose delay requirements, the lower TTT values could be used.

Note that the above criteria for setting different TTT values could be used in combination with each other and also with those discussed in the previous section. For example, UEs might check mass toggling indicators (as discussed above) after the TTT, which was set according to one or a combination of the above configurations, has expired before they decide to perform access link/network switching.

Advantages:

Policies can be pseudo-static, i.e. little UE-specific signaling.

Randomization can be applied only where needed.

Only limited signaling (broadcast) needed to configure randomization

Randomized both from a network and from a UE perspective.

Exemplary UE and Network Node

Figure 10:
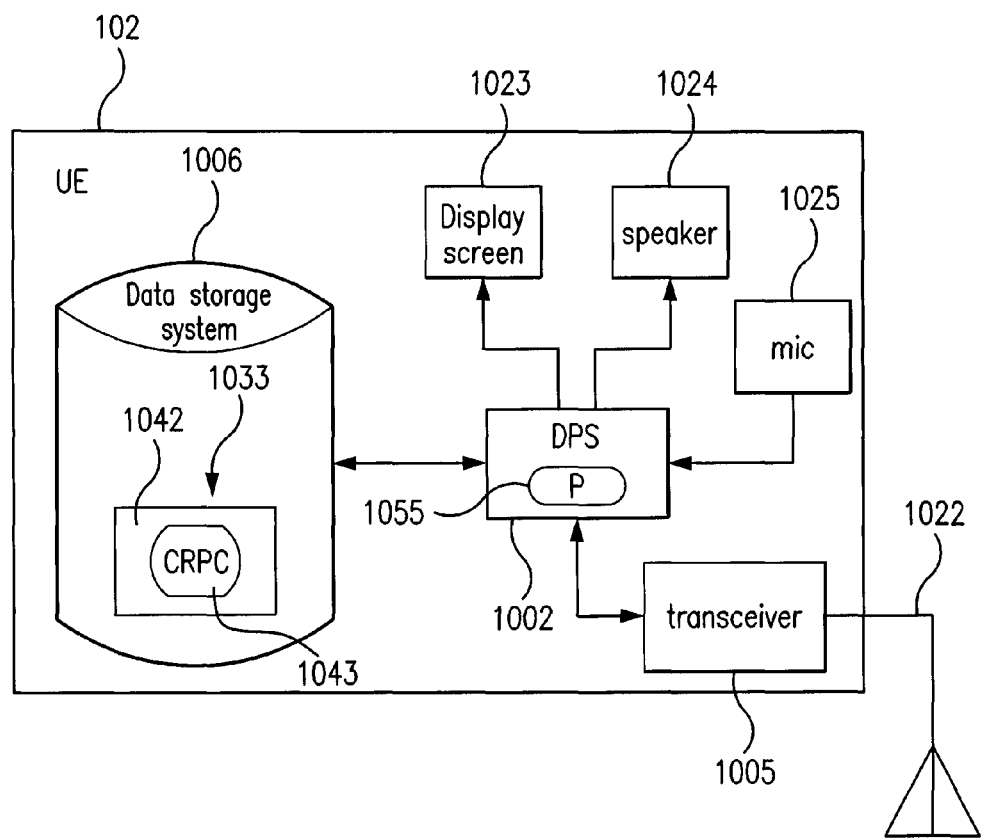
FIG. 10 illustrates a UE according to some embodiments.

FIG. 10 illustrates a block diagram of an example UE 300. As shown in FIG. 10, UE 300 includes: a data processing system (DPS) 1002, which may include one or more processors (P) 1055 (e.g., microprocessors) and/or one or more circuits, such as an application specific integrated circuit (ASIC), Field-programmable gate arrays (FPGAs), etc.; a transceiver 1005, connected to an antenna 1022, for receiving messages from, and transmitting messages to, access points (e.g., eNB 320, Wi-Fi AP 310); a data storage system 1006, which may include one or more computer-readable data storage mediums, such as non-transitory memory unit (e.g., hard drive, flash memory, optical disk, etc.) and/or volatile storage apparatuses (e.g., dynamic random access memory (DRAM)).

In embodiments where data processing system 1002 includes a processor 1055 (e.g., a microprocessor), a computer program product 1033 may be provided, which computer program product includes: computer readable program code 1043 (e.g., instructions), which implements a computer program, stored on a computer readable medium 1042 of data storage system 1006, such as, but not limited, to magnetic media (e.g., a hard disk), optical media (e.g., a DVD), memory devices (e.g., random access memory), etc. In some embodiments, computer readable program code 1043 is configured such that, when executed by data processing system 1002, code 1043 causes the data processing system 1002 to perform steps described herein.

In some embodiments, UE 300 is configured to perform steps described above without the need for code 1043. For example, data processing system 1002 may consist merely of specialized hardware, such as one or more application-specific integrated circuits (ASICs). Hence, the features of the present invention described above may be implemented in hardware and/or software. For example, in some embodiments, the functional components of UE 300 described above may be implemented by data processing system 1002 executing program code 1043, by data processing system 1002 operating independent of any computer program code 1043, or by any suitable combination of hardware and/or software.

In a second embodiment, UE 300 further includes: 1) a display screen 1023 coupled to the data processing system 1002 that enables the data processing system 1002 to display information to a user of UE 300; 2) a speaker 1024 coupled to the data processing system 1002 that enables the data processing system 1002 to output audio to the user of UE 300; and 3) a microphone 1025 coupled to the data processing system 1002 that enables the data processing system 1002 to receive audio from the user.

Figure 16:
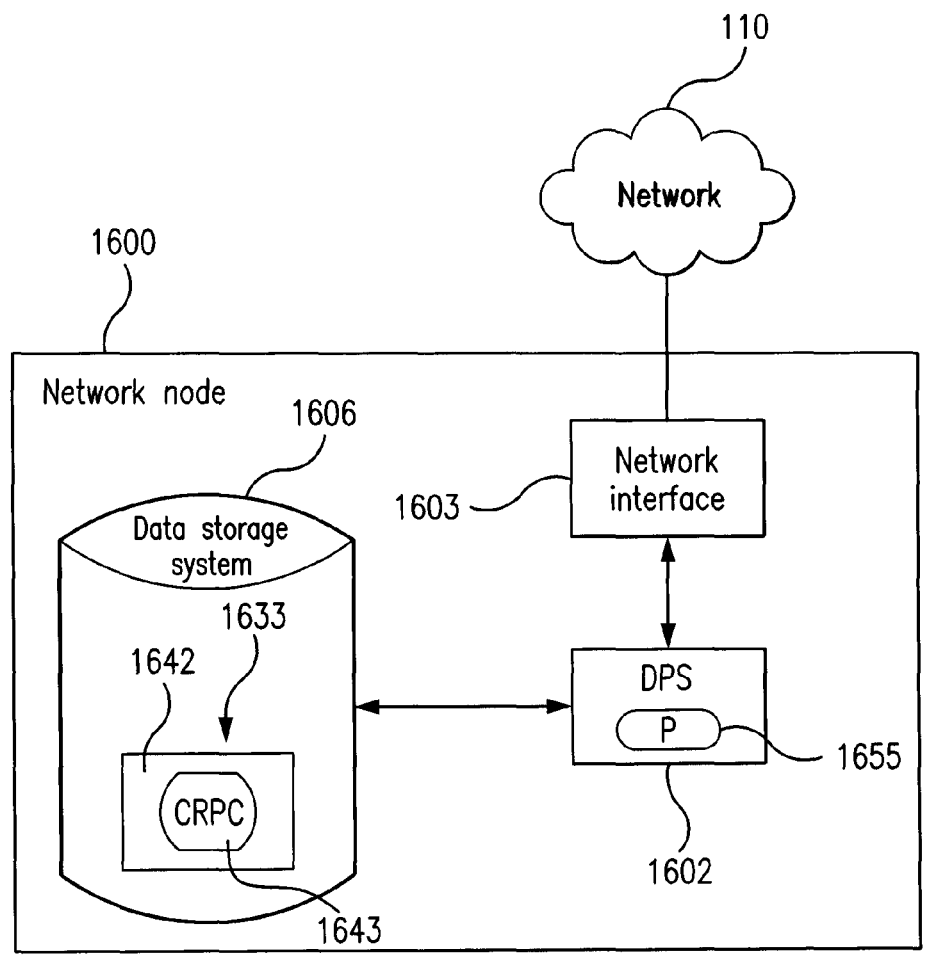
FIG. 16 illustrates a network node according to some embodiments.

FIG. 16 illustrates a block diagram of an example network node 1600. As shown in FIG. 16, network node 1600 includes: a data processing system (DPS) 1602, which may include one or more processors (P) 1655 (e.g., microprocessors) and/or one or more circuits, such as an application specific integrated circuit (ASIC), Field-programmable gate arrays (FPGAs), etc.; a network interface 1603 for connecting to a network 110; a data storage system 1606, which may include one or more computer-readable data storage mediums, such as non-transitory memory unit (e.g., hard drive, flash memory, optical disk, etc.) and/or volatile storage apparatuses (e.g., dynamic random access memory (DRAM)). In embodiments where data processing system 1602 includes a processor 1655 (e.g., a microprocessor), a computer program product 1633 may be provided, which computer program product includes: computer readable program code 1643 (e.g., instructions), which implements a computer program, stored on a computer readable medium 1642 of data storage system 1606, such as, but not limited, to magnetic media (e.g., a hard disk), optical media (e.g., a DVD), memory devices (e.g., random access memory), etc. In some embodiments, computer readable program code 1643 is configured such that, when executed by data processing system 1602, code 1643 causes the data processing system 1602 to perform steps described herein. In some embodiments, network node 1600 is configured to perform steps described above without the need for code 1643. For example, data processing system 1602 may consist merely of specialized hardware, such as one or more application-specific integrated circuits (ASICs). Hence, the features of the present invention described above may be implemented in hardware and/or software. For example, in some embodiments, the functional components of network node 1600 described above may be implemented by data processing system 1602 executing program code 1643, by data processing system 1602 operating independent of any computer program code 1643, or by any suitable combination of hardware and/or software.

Methods According to Some Embodiments

Figure 11:
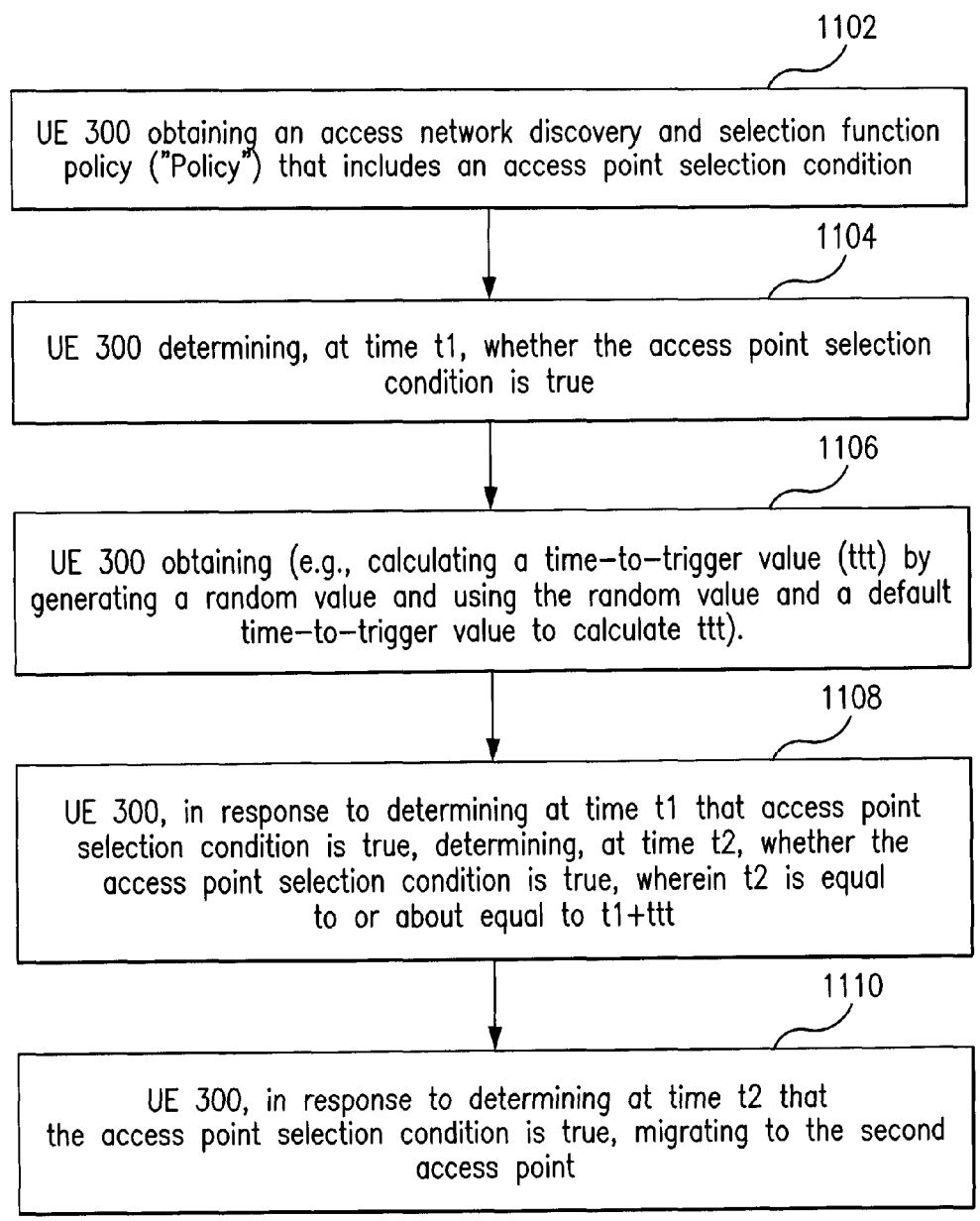
FIG. 11 is a flow chart illustrating a process according to some embodiments.

In a first aspect, there is provided a method performed by UE 300 for determining whether to migrate from a first access point to a second access point. FIG. 11 illustrates one embodiment of the method. In this embodiment, the method includes: 1) UE 300 obtaining an access network discovery and selection function policy ("Policy") that includes an access point selection condition (step 1102); 2) UE 300 determining, at time t1, whether the access point selection condition is true (step 1104); 3) UE 300 obtaining a time-to-trigger value (ttt) (step 1106); 4) UE 300, in response to determining at time t1 that the access point selection condition is true, determining, at time t2, whether the access point selection condition is true, wherein t2 is equal to or about equal to t1+ttt (step 1108); and 5) UE 300, in response to in response to determining at time t2 that the access point selection condition is true, migrating to the second access point (step 1110). In some embodiments, obtaining ttt (i.e., step 1106) comprises calculating ttt by, for example, generating a random value and using the random value and a default time-to-trigger value to calculate ttt. The step of generating the random value may comprise generating an initial random value and multiplying the initial random value by an amplitude parameter.

Figure 12:
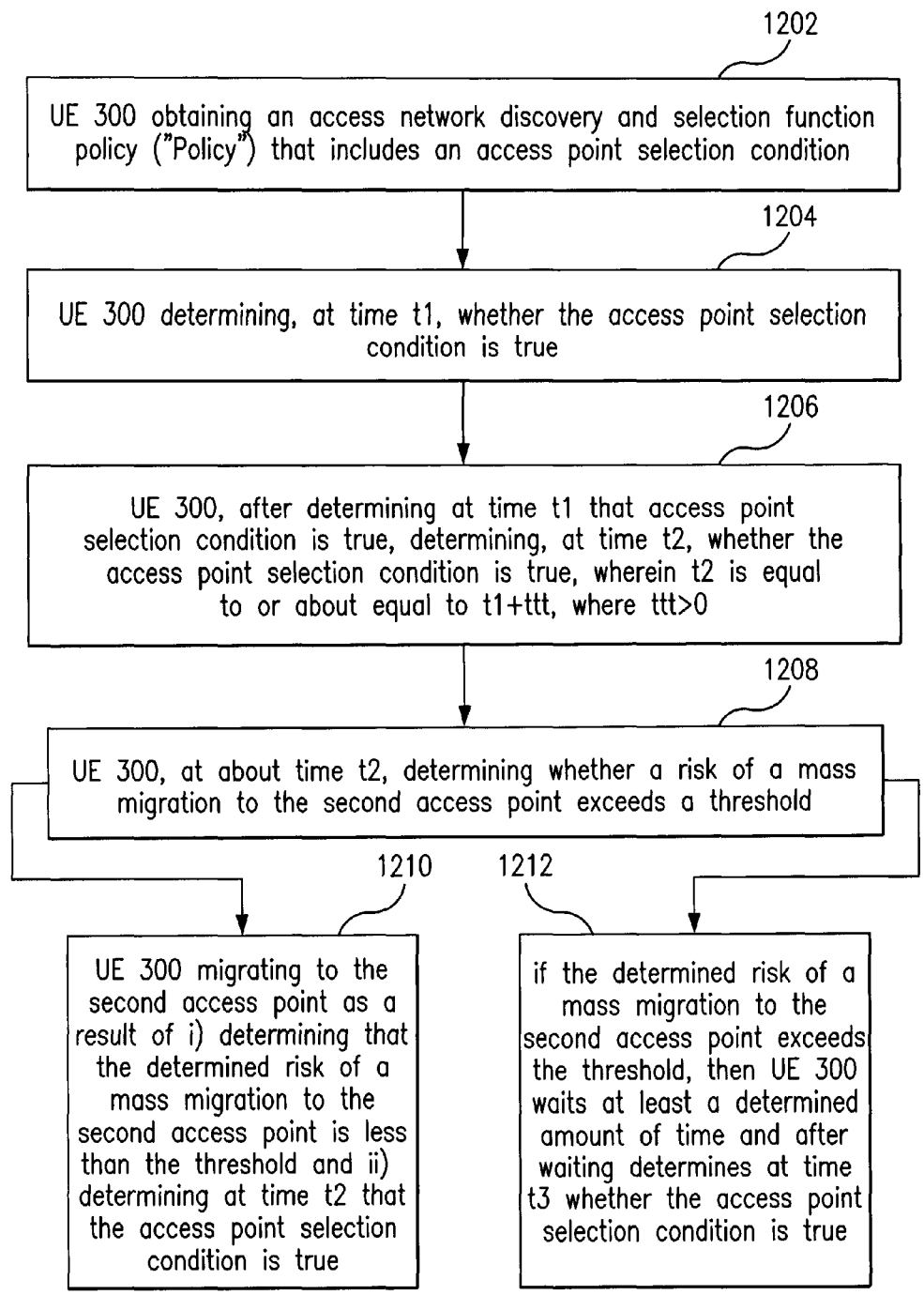
FIG. 12 is a flow chart illustrating a process according to some embodiments.

FIG. 12 illustrates another embodiment of the method. In the embodiment shown in FIG. 12 the method includes: 1) UE 300 obtaining an access network discovery and selection function policy ("Policy") that includes an access point selection condition (step 1202); 2) UE 300 determining, at time t1, whether the access point selection condition is true (step 1204); 3) UE 300, after determining at time t1 that the access point selection condition is true, determining, at time t2, whether the access point selection condition is true, wherein t2 is equal to or about equal to t1+ttt, where ttt>0(step 1206); 4) UE 300, at about time t2, determining whether a determined risk of a mass migration to the second access point exceeds a threshold (step 1208); and 5) UE 300 migrating to the second access point as a result of i) determining that the determined risk of a mass migration to the second access point is less than the threshold and ii) determining at time t2 that the access point selection condition is true (step 1210). Otherwise, if the determined risk of a mass migration to the second access point exceeds the threshold, then UE 300 waits at least a determined amount of time and after waiting determines at time t3 whether the access point selection condition is true (step 1212). The method may further include UE 300 migrating to the second access point as a result of determining at time t3 that the access point selection condition is true.

In one embodiment, determining whether the risk of a mass migration to the second access point comprises determining a number of UEs that have migrated to the second access point between time t1 and time t2 and determining whether the determined number of UEs exceeds a threshold.

Figure 13:
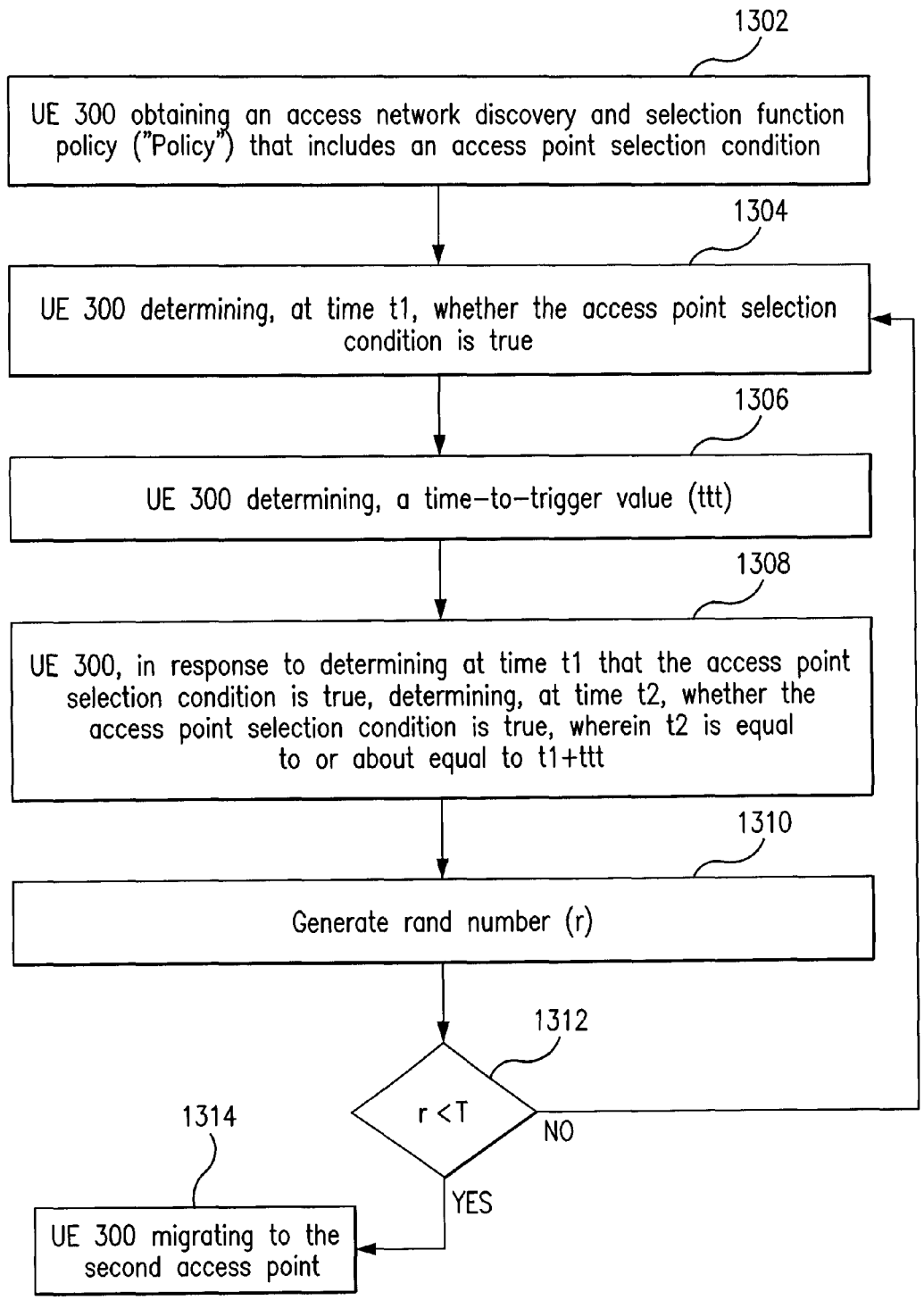
FIG. 13 is a flow chart illustrating a process according to some embodiments.

FIG. 13 illustrates another embodiment of the method. In the embodiment shown in FIG. 13 the method includes: 1) UE 300 obtaining an access network discovery and selection function policy ("Policy") that includes an access point selection condition (step 1302); 2) UE 300 determining, at time t1, whether the access point selection condition is true (step 1304); 3) UE 300 determining a time-to-trigger value (ttt) (step 1306); 4) UE 300, in response to determining at time t1 that the access point selection condition is true, determining, at time t2, whether the access point selection condition is true, wherein t2 is equal to or about equal to t1+ttt (step 1308); 5) UE 300 generating a random value (r) (r may be a true random value or a pseudo random value) (step 1310); 6) UE 300 determining whether r satisfies a condition (e.g., determining whether r is greater than or equal to a threshold value (T) (T may be a value that is determined (e.g., calculated or selected) based on the value of another parameter, such as a signal quality indicator) (step 1312); and 7) UE 300 migrating to the second access point in response to determining that r satisfies the condition (step 1314).

In each of the above embodiments, the step of obtaining the Policy may consists of receiving the policy from a policy server (e.g., server 380). Alternatively, in each of the above aspects, the step of obtaining the Policy may consists of retrieving the policy from a storage device within the UE (e.g., data storage system 1006).

In each of the above embodiments, the method may further include UE 300 receiving a message that it should apply randomization in the access point selection process. In one embodiment, the message is a one bit message. In a second embodiments, the message identifies a random value distribution (e.g., uniform or Gaussian) and/or a parameter to be randomized.

Figure 14:
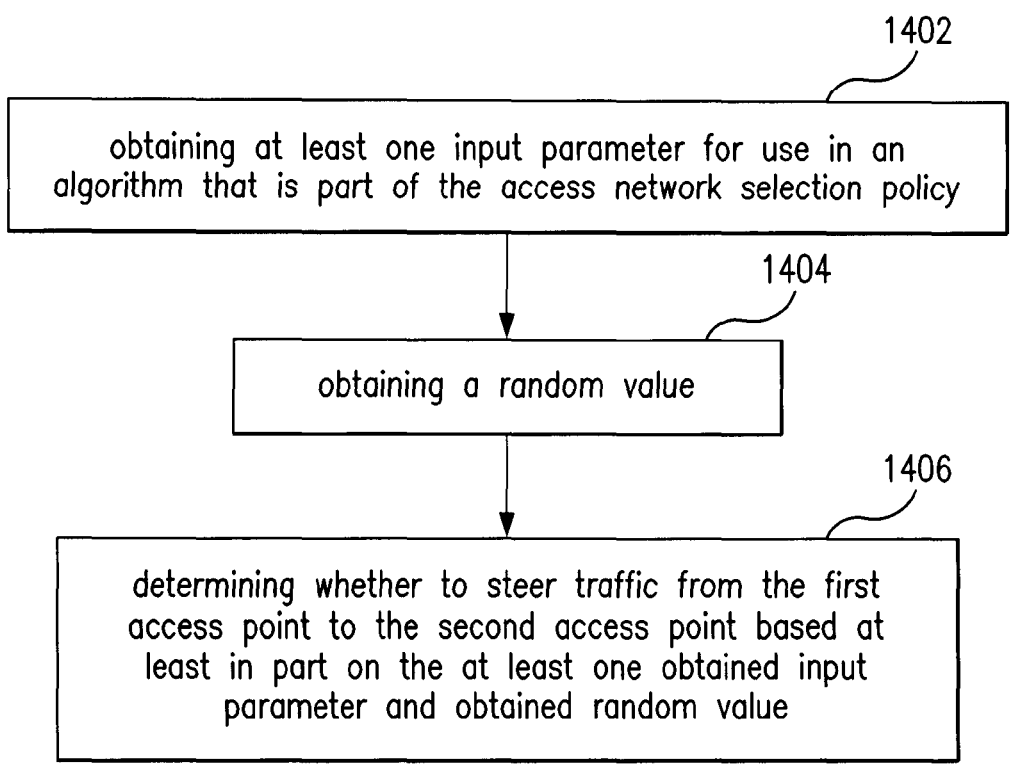
FIG. 14 is a flow chart illustrating a process according to some embodiments.

FIG. 14 illustrates another method 1400 according to some embodiments. Method 1400 is method performed by a WCD (e.g., UE 300 for determining whether to steer traffic from a first access point (e.g., eNB 320 or eNB 322) to a second access point (e.g., Wi-Fi AP 310). The determining is based on an access network selection policy. As shown in FIG. 14, the method includes the WCD obtaining (e.g., receiving or retrieving) at least one input parameter for use in an algorithm that is part of the access network selection policy (step 1402). In some embodiments, the WCD obtains the at least one input parameter by receiving the at least one input parameter from a radio access network. The at least one input parameter may be one of a time-to-trigger parameter, a signal quality parameter, and a load parameter. If an input parameter is a signal quality parameter, the input parameter may be one of: a reference signal received power (RSRP) measure, reference signal received quality (RSRQ) measure, a received signal strength indication, and a received channel power indicator. If an input parameter is a load parameter, the input parameter may be one of: a basic service set load, a cellular network load, and a wireless local area network metric. The method also includes the WCD obtaining (e.g., receiving or generating) a random value (step 1404). Further, the method includes the WCD determining whether to steer traffic from the first access point to the second access point based at least in part on the at least one obtained input parameter and the obtained random value (step 1406).

In some embodiments, method 1400 further includes the WCD obtaining the access network selection policy. The step of obtaining the access network selection policy may include one of: i) receiving the access network selection policy, and ii) retrieving the access network selection policy from a storage device 1006 in the WCD.

In some embodiments, the step of determining whether to steer traffic from the first access point to the second access point comprises using the random value to scale the at least one obtained input parameter. In some embodiments, determining whether to steer traffic from the first access point to the second access point further comprises using the scaled at least one obtained input parameter in the algorithm that is part of the access network selection policy.

Figure 15:
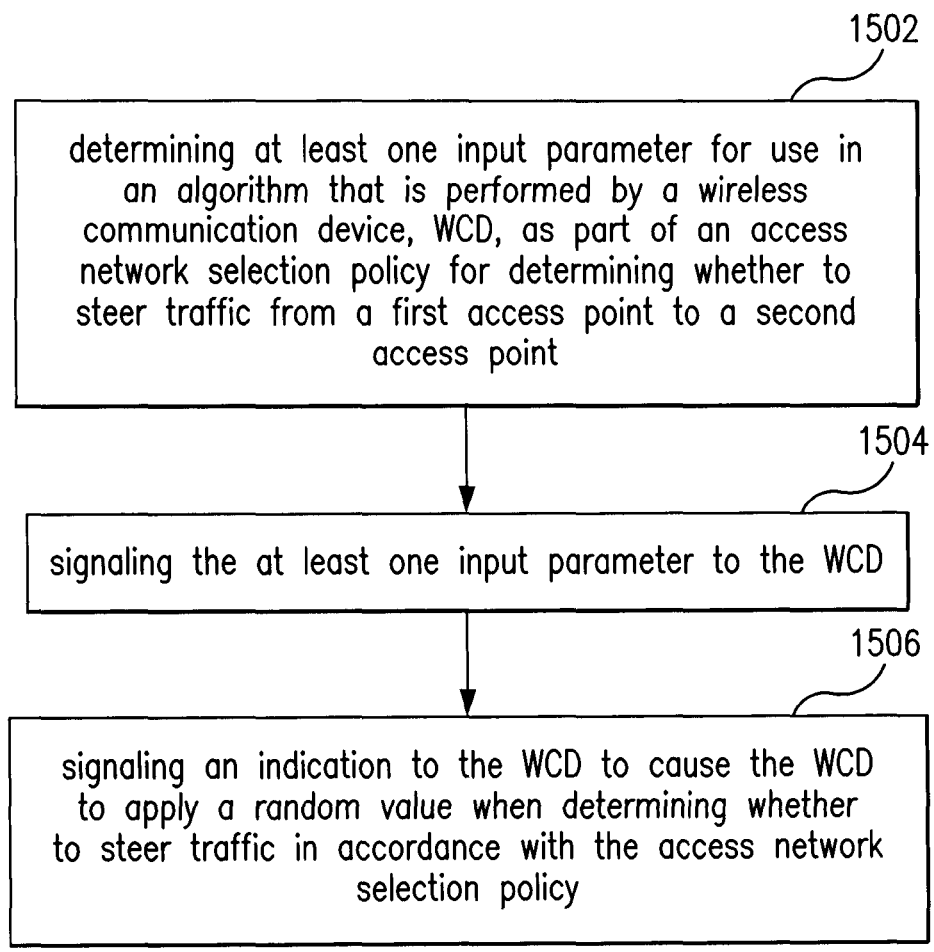
FIG. 15 is a flow chart illustrating a process according to some embodiments.

FIG. 15 illustrates another method 1500 according to some embodiments. Method 1500 is method performed by a network node (e.g., node 1600), which may be an access point or a core network node. Method 1500 may being with step 1502, where the network node determines at least one input parameter for use in an algorithm that is performed by a wireless communication device, WCD, as part of an access network selection policy for determining whether to steer traffic from a first access point to a second access point (step 1502). In step 1504, the network nodes signals the at least one input parameter to the WCD. In step 1506, the network node signals an indication to the WCD to cause the WCD to apply a random value when determining whether to steer traffic in accordance with the access network selection policy. The indication may be a single bit value. The at least one input parameter may be at least one of: a time-to-trigger parameter, a signal quality parameter, and a load parameter. In some embodiments, the network node signals the access network selection policy to the WCD.

UEs According to Some Embodiments

In some embodiments, a wireless communication device (UE) is provided. In one embodiment, the UE comprises: a data storage system 1006 and a data processing system 1002, the data storage system comprising instructions 1043 executable by the data processing system whereby the UE is operative to: communicate with a first access point; determine, at time t1, whether an access point selection condition associated with a second access point is true; calculate a time-to-trigger value (ttt) by, for example, generating a random value and using the random value and a default time-to-trigger value to calculate ttt; in response to determining at time t1 that the access point selection condition is true, determining, at time t2, whether the access point selection condition is true, wherein t2 is equal to or about equal to t1+ttt; and in response to in response to determining at time t2 that the access point selection condition is true, migrating to the access point.

The UE may be adapted to generate the random value by generating an initial random value and multiplying the initial random value by an amplitude parameter.

In another embodiment, the UE is operative to: communicate with a first access point; determine, at time t1, whether an access point selection condition associated with a second access point is true; after determining at time t1 that the access point selection condition is true, determine, at time t2, whether the access point selection condition is true, wherein t2 is equal to or about equal to t1+ttt, where ttt>0; at about time t2, determine whether the risk of a mass migration to the second access point exceeds a threshold; and migrate to the second access point as a result of i) determining that the determined risk of a mass migration to the second access point is less than the threshold and ii) determining at time t2 that the access point selection condition is true.

The UE is further configured such that, if the determined risk of a mass migration to the second access point exceeds the threshold but the access point selection condition was determined to be true, the UE waits at least a determined amount of time and after waiting determines at time t3 whether the access point selection condition is true. The UE may be further configured to migrate to the second access point as a result of determining at time t3 that the access point selection condition is true.

In yet another embodiment, the UE is operative to: communicate with a first access point; determine, at time t1, whether an access point selection condition associated with a second access point is true; determine a time-to-trigger value (ttt); in response to determining at time t1 that the access point selection condition is true, determine, at time t2, whether the access point selection condition is true, wherein t2 is equal to or about equal to t1+ttt; generate a random value (r) (r may be a true random value or a pseudo random value); determine whether r satisfies a condition (e.g., determining whether r is greater than or equal to a threshold value (T) (as discussed above, T may be a value that is determined (e.g., calculated or selected) based on the value of another parameter, such as a signal quality indicator); and migrate to the second access point in response to determining that r satisfies the condition.

In one embodiment, the UE is configured such that, in response to determining that r does not satisfy the condition, the UE waits a determined amount of time before again determining whether the access point selection condition associated with the second access point is true.

In another embodiment, the UE is operative to: 1) obtain at least one input parameter for use in an algorithm that is part of an access network selection policy for determining whether to steer traffic from a first access point to a second access point; 2) obtain a random value; and 3) determine whether to steer traffic from the first access point to the second access point based at least in part on the at least one obtained input parameter and the obtained random value.

Network Nodes According to Some Embodiments

In one embodiment, network node 1600 comprises: a data storage system 1606 and a data processing system 1602, the data storage system comprising instructions 1643 executable by the data processing system whereby the UE is operative to: 1) determine at least one input parameter for use in an algorithm that is performed by a WCD 300 as part of an access network selection policy for determining whether to steer traffic from a first access point (e.g., 320, 322 or 324) to a second access point (e.g., AP 310); signal the at least one input parameter to the WCD; and signal an indication to the WCD to cause the WCD to apply a random value when determining whether to steer traffic in accordance with the access network selection policy.

While various aspects and embodiments of the present disclosure have been described above, it should be understood that they have been presented by way of example only, and not limitation. Thus, the breadth and scope of the present disclosure should not be limited by any of the above-described exemplary embodiments. Moreover, any combination of the elements described in this disclosure in all possible variations thereof is encompassed by the disclosure unless otherwise indicated herein or otherwise clearly contradicted by context.

Additionally, while the processes described herein and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a wireless communication device (WCD) for determining whether to steer traffic from a first access point to a second access point, wherein the determining is based on an access network selection policy, the method comprising:

determining whether the access network selection policy for steering traffic is fulfilled, wherein the determining comprises: a) obtaining, at time t1, a first value associated with the second access point and b) deciding, based on the first value obtained at time t1, whether the WCD is barred from associating with the second access point, wherein deciding whether the WCD is barred from associating with the second access point comprises comparing the first value to a threshold, wherein the first value is one of: i) a signal quality value indicating the quality of a signal transmitted by the second access point and ii) a load value indicating a load on the second access point;

obtaining an input parameter for use in an algorithm that is part of the access network selection policy, wherein the obtained input parameter is a default time-to-trigger value;

obtaining a random value; and using the random value and the default time-to-trigger value to determine a time-to trigger (ttt), wherein in response to deciding that the WCD is not barred from associating with the second access point based on the first value obtained at time t1, the WCD further performs the steps of: a) obtaining, at a time t2, wherein the time t2 is equal to or greater than the time t1 +the ttt, a second value associated with the second access point and b) deciding, based on the second value obtained at time t2, whether the WCD is barred from associating with the second access point, wherein deciding whether the WCD is barred from associating with the second access point based on the second value comprises comparing the second value to said threshold, wherein the second value is one of: i) a signal quality value indicating the quality of a signal transmitted by the second access point and ii) a load value indicating a load on the second access point, and after deciding based on the second value obtained at time t2 that the WCD is not barred from associating with the second access point, the WCD transmits to the second access point a request for associating with the access point.

2. The method according to claim 1, wherein the first value is a signal quality value indicating the quality of a signal transmitted by the second access point.

3. The method according to claim 2, wherein the signal quality value is one of: a reference signal received power measure, a reference signal received quality measure, a received signal strength indication, and a received channel power indicator.

4. The method according to claim 1, wherein
the first value is a load value, and
the load value is one of: basic service set load being a basic building block of an 802.11 wireless Local Area Network, cellular network load, and a wireless local area network metric.

5. The method according to any claim 1, wherein obtaining the input parameter comprises receiving the input parameter.

6. The method according to claim 1, wherein obtaining the random value comprises generating the random value.

7. The method of claim 1, wherein
in response to deciding based on the second value obtained at time t2 that the WCD is not barred from associating with the second access point, the WCD generates a second random value and compares the second random value to a probability value to determine whether the second random value is not greater than the probability value, and
the WCD transmits the request as a result of determining that the second random value is not greater than the probability value.

8. The method of claim 7, further comprising the WCD determining the probability value based on a difference between the first value and a threshold value.

9. A wireless communication device (WCD), the WCD comprising:
one or more processors; and
a computer readable medium containing instructions executable by the one or more processors to cause the WCD to:
determine whether an access network selection policy for steering traffic from a first access point to a second access point is fulfilled by performing a process comprising: a) obtaining, at time t1, a first value associated with the second access point and b) deciding, based on the first value obtained at time t1, whether the WCD is barred from associating with the second access point, wherein deciding whether the WCD is barred from associating with the second access point comprises comparing the first value to a threshold, wherein the first value is one of: i) a signal quality value indicating the quality of a signal transmitted by the second access point and ii) a load value indicating a load on the second access point;
obtain an input parameter for use in an algorithm that is part of the access network selection policy, wherein the obtained input parameter is a default time-to-trigger value;
obtain a random value; and
use the random value and the default time-to-trigger value to determine a time-to-trigger (ttt), wherein the WCD is configured such that:
in response to the WCD deciding that the WCD is not barred from associating with the second access point based on the first value obtained at time t1, the WCD further performs the steps of: a) obtaining, at a time t2, wherein the time t2 is equal to or greater than the time t1 + the ttt, a second value associated with the second access point and b) deciding, based on the second value obtained at time t2, whether the WCD is barred from associating with the second access point, wherein deciding whether the WCD is barred from associating with the second access point based on the second value comprises comparing the second value to said threshold, wherein the second value is one of: i) a signal quality value indicating the quality of a signal transmitted by the second access point and ii) a load value indicating a load on the second access point, and
in response to deciding based on the second value obtained at time t2 that the WCD is not barred from associating with the second access point, the WCD transmits to the second access point a request for associating with the access point.

10. The wireless communication device according to claim 9, wherein the first value is a signal quality value indicating the quality of a signal transmitted by the second access point.

11. The wireless communication device according to claim 9, wherein the signal quality value is one of: a reference signal received power measure, a reference signal received quality measure, a received signal strength indication, and a received channel power indicator.

12. The wireless communication device according to claim 9, wherein the instructions to obtain the random value comprise instructions to generate the random value.

13. The wireless communication device according to claim 9, wherein the instructions further comprise instructions to cause the WCD to obtain the access network selection policy by one of: i) receiving the access network selection policy, and ii) retrieving the access network selection policy from the storage system.

14. The wireless communication device according to claim 9, wherein the instructions further comprise instructions to cause the WCD to:
determine, prior to steering traffic to the second access point, a risk of a mass migration to the second access point;
determine whether the determined risk of a mass migration to the second access point exceeds a threshold; and
determine whether to steer traffic from the WCD to the second access point as a result of:
i) whether the determined risk of a mass migration to the second access point exceeds the threshold and ii) whether the access point selection policy conditions are fulfilled.

* * * * *